US010625427B2

United States Patent
Troy et al.

(10) Patent No.: US 10,625,427 B2
(45) Date of Patent: Apr. 21, 2020

(54) METHOD FOR CONTROLLING LOCATION OF END EFFECTOR OF ROBOT USING LOCATION ALIGNMENT FEEDBACK

(71) Applicant: The Boeing Company, Chicago, IL (US)

(72) Inventors: James J. Troy, Issaquah, WA (US); Gary E. Georgeson, Tacoma, WA (US); Scott W. Lea, Renton, WA (US); Daniel James Wright, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 279 days.

(21) Appl. No.: 15/623,304

(22) Filed: Jun. 14, 2017

(65) Prior Publication Data

US 2018/0361595 A1    Dec. 20, 2018

(51) Int. Cl.
*G06F 19/00* (2018.01)
*B25J 13/08* (2006.01)
(Continued)

(52) U.S. Cl.
CPC ........... *B25J 13/088* (2013.01); *B25J 9/162* (2013.01); *B25J 9/1692* (2013.01); *B25J 9/1694* (2013.01);
(Continued)

(58) Field of Classification Search
CPC ........ B25J 13/088; B25J 9/162; B25J 9/1692; B25J 9/1694; B25J 11/00; B25J 19/023;
(Continued)

(56) References Cited

U.S. PATENT DOCUMENTS 6,231,280 B1   5/2001  Bullen
6,751,342 B2   6/2004  Shepard
(Continued)

FOREIGN PATENT DOCUMENTS

WO    2011149582 A1   12/2011
WO    2016174445 A1   11/2016

OTHER PUBLICATIONS

Yuhao Gao et al.: "The method of aiming towards the normal direction for robotic drilling", International Journal of Precision Engineering and Manufacturing, Korean Society for Precision Engineering, Springer, vol. 18, No. 6, Jun. 7, 2017, pp. 787-794.
(Continued)

*Primary Examiner* — Ronnie M Mancho
(74) *Attorney, Agent, or Firm* — Ostrager Chong Flaherty & Broitman P.C.

(57) ABSTRACT

Systems and methods for automating robotic end effector alignment using real-time data from multiple distance sensors to control relative translational and rotational motion. In accordance with one embodiment, the alignment process involves computation of offset distance and rotational angles to guide a robotic end effector to a desired location relative to a target object. The relative alignment process enables the development of robotic motion path planning applications that minimize on-line and off-line motion path script creation, resulting in an easier-to-use robotic application. A relative alignment process with an independent (off-board) method for target object coordinate system registration can be used. One example implementation uses a finite-state machine configuration to control a holonomic motion robotic platform with rotational end effector used for grid-based scan acquisition for non-destructive inspection.

20 Claims, 18 Drawing Sheets

(51) Int. Cl.

| | | |
|---|---|---|
| *B25J 19/02* | (2006.01) | |
| *B25J 11/00* | (2006.01) | |
| *G01B 11/00* | (2006.01) | |
| *G01C 3/08* | (2006.01) | |
| *G01N 25/72* | (2006.01) | |
| *G01J 5/04* | (2006.01) | |
| *B25J 9/16* | (2006.01) | |
| *G01J 5/00* | (2006.01) | |

(52) U.S. Cl.
CPC ............. *B25J 11/00* (2013.01); *B25J 19/023* (2013.01); *G01B 11/002* (2013.01); *G01C 3/08* (2013.01); *G01J 5/04* (2013.01); *G01N 25/72* (2013.01); *G01J 2005/0081* (2013.01); *G05B 2219/39024* (2013.01); *G05B 2219/40298* (2013.01); *G05B 2219/45066* (2013.01); *G05B 2219/45071* (2013.01); *Y10S 901/01* (2013.01); *Y10S 901/44* (2013.01)

(58) Field of Classification Search
CPC .. G01B 11/002; G01C 3/08; G01J 5/04; G01J 2005/0081; G01N 25/72; G05B 2219/39024; G05B 2219/40298; G05B 2219/45066; G05B 2219/45071; Y10S 901/01; Y10S 901/44
USPC .................................................. 700/400, 258
See application file for complete search history.

(56) References Cited

U.S. PATENT DOCUMENTS

| | | | |
|---|---|---|---|
| 6,826,299 | B2 | 11/2004 | Brown et al. |
| 6,990,215 | B1 | 1/2006 | Brown et al. |
| 7,075,084 | B2 | 7/2006 | Thompson et al. |
| 7,110,194 | B2 | 9/2006 | Hubbs |
| 7,119,338 | B2 | 10/2006 | Thompson et al. |
| 7,186,981 | B2 | 3/2007 | Shepard et al. |
| 7,194,358 | B2 | 3/2007 | Callaghan et al. |
| 7,287,902 | B2 | 10/2007 | Safai et al. |
| 7,454,265 | B2 | 11/2008 | Marsh |
| 7,513,964 | B2 | 4/2009 | Ritter et al. |
| 7,587,258 | B2 | 9/2009 | Marsh et al. |
| 7,643,893 | B2 | 1/2010 | Troy et al. |
| 7,743,660 | B2 | 6/2010 | Marsh et al. |
| 7,783,376 | B2 | 8/2010 | Marsh et al. |
| 7,800,758 | B1 | 9/2010 | Bridges et al. |
| 7,859,655 | B2 | 12/2010 | Troy et al. |
| 8,043,033 | B2 | 10/2011 | Clark |
| 8,467,071 | B2 | 6/2013 | Steffey et al. |
| 8,713,998 | B2 | 5/2014 | Troy et al. |
| 8,892,252 | B1 * | 11/2014 | Troy ...................... G01B 11/14 700/213 |
| 9,410,659 | B2 | 8/2016 | Troy et al. |
| 9,519,844 | B1 * | 12/2016 | Thompson ........... G06K 9/6267 |
| 9,645,012 | B2 * | 5/2017 | Marsh .................... H04N 5/332 |
| 9,664,652 | B2 * | 5/2017 | Fetzer .................. G01N 29/225 |
| 2007/0269098 | A1 | 11/2007 | Marsh |
| 2013/0135480 | A1 | 5/2013 | Stratmann et al. |
| 2015/0268033 | A1 | 9/2015 | Troy et al. |
| 2016/0008988 | A1 * | 1/2016 | Kennedy .................... B25J 9/06 414/738 |
| 2017/0277966 | A1 * | 9/2017 | Abousleman ........ G06K 9/3233 |
| 2018/0361571 | A1 * | 12/2018 | Georgeson .............. B25J 9/162 |

OTHER PUBLICATIONS

T. Olsson et al.: "Cost-efficient drilling using industrial robots with high-bandwidth force feedback", Robotics and Computer Integrated Manufacturing, Elsevier Science Publishers BV., Barking, GB, vol. 26, No. 1, Feb. 1, 2010, pp. 24-38.

Felix Von Drigalski et al.: "Vibration-Reducing End Effector for Automation of Drilling Tasks in Aircraft Manufacturing", IEEE Robotics and Automation Letters, IEEE, vol. 2, No. 4, Oct. 1, 2017, pp. 2316-2321.

Troy Gray et al.: "Mobile Automated Robotic Drilling, Inspection, and Fastening", SAE Technical Paper Series, vol. 1, Sep. 17, 2013.

Tian Wei et al.: "Auto-normalization algorithm for robotic precision drilling system in aircraft component assembly", Chinese Journal of Aeronautics, vol. 26, No. 2, Mar. 7, 2013, pp. 495-500.

Maozhen Gong et al.: "A novel method of surface-normal measurement in robotic drilling for aircraft fuselage using three laser range sensors", Advanced Intelligent Mechatronics (SIM), 2012 IEEE/ASME International Conference on, IEEE, Jul. 11, 2012, pp. 450-455.

Christian Scheurer et al.: "Industrial implementation of a multi-task redundancy resolution at velocity level for highly redundant mobile manipulators", Robotics in the Era of Digitalisation: 47th International Symposium on Robotics: Jun. 21-22, 2016, Messe Munchen, Entrance East, Munich Germany, Jun. 21, 2016, pp. 109-117.

Yoram Koren et al.: "End-Effector Guidance of Robot Arms", CIRP Annals., vol. 36, No. 1, Jan. 1, 1987, pp. 289-292.

Extended European Search Report dated Dec. 5, 2018 in European Patent Application No. 18170755.5 (European counterpart to the instant patent application).

Extended European Search Report dated Dec. 5, 2018 in European Patent Application No. 18170741.5 (European counterpart to the instant patent application).

* cited by examiner

METHOD FOR CONTROLLING LOCATION OF END EFFECTOR OF ROBOT USING LOCATION ALIGNMENT FEEDBACK

STATEMENT REGARDING FEDERALLY SPONSORED RESEARCH OR DEVELOPMENT

This invention was made with Government support under Contract No. NNL09AA00A awarded by NASA. The Government has certain rights in this invention.

BACKGROUND

This disclosure generally relates to systems and methods for controlling the location of an end effector of a robot relative to a target object during the performance of automated procedures such as non-destructive inspection (NDI) and other maintenance operations.

Existing robot programming techniques require each individual robot motion sequence to be entered into a motion control process (e.g., motion script), typically involving on-line teaching or off-line programming methods—but these usually require a high level of expertise and effort from the robot programmers.

Standard open-loop programming techniques also have problems if the alignment between the robot and the target object deteriorates, which can be the case with ground-based robots that move over surfaces that may be uneven, have cracks, holes, or other discontinuities. Existing open-loop robot programming techniques cannot adapt to misalignment (for example, dead reckoning odometry alone is not sufficient since error builds up over time). To address this situation, some approaches use external hardware to provide continuous closed-loop feedback of the location of the scanner. An example of this is motion capture (see, e.g., U.S. Pat. Nos. 7,643,893 and 8,892,252), which use multiple cameras to track retro-reflective optical targets attached to the moving and target objects. Those types of solutions require that external hardware be set up prior to use, which can be problematic in some use cases. Other solutions use contact alignment processes to assist in aligning the end effector to a workpiece.

SUMMARY

The subject matter disclosed in some detail below is directed to systems and methods for controlling the location of an end effector of a ground-based robotic mobile platform relative to a target object during the performance of automated operations. In some ground-based robotic mobile platforms, the robot comprises a robotic arm having a wrist at a distal end thereof, to which an end effector is attached. A tool (e.g., an NDI sensor) is attached to the end effector. Typically the robot controller is configured to control various motors of the robot so that the end effector is moved to a location (i.e., as used herein, the term "location" includes both position and orientation) whereat the end effector and the tool attached thereto will be properly aligned with the portion of the target object to be scanned.

More specifically, the subject matter disclosed herein is directed to systems and methods for automating robotic end effector alignment using real-time data from multiple distance sensors to control relative translational and rotational motion. In accordance with one embodiment, the alignment process involves computation of offset distance and rotational angles to guide a robotic end effector to a desired location relative to a target object. [As used herein, the term "goal offset distance" refers to the desired (i.e., goal) distance between the distal end of the tool mounted to the end effector and the target surface. For example, in the case of a non-contact NDI process, the system operator needs to specify the goal offset distance between the NDI sensor and the target object that the operator would like to achieve.] The relative alignment process enables the development of robotic motion path planning applications that minimize on-line and off-line motion path script creation, resulting in an easier-to-use robotic application. Also disclosed in some detail below is the integration of this relative alignment process with an independent (off-board) method for target object coordinate system registration. An example implementation is provided using a finite-state machine configuration to control a holonomic motion robotic platform with rotational end effector used for grid-based scan acquisition for NDI. A finite-state machine control application is a process that takes high-level goals, feedback from sensors, constraints, and trigger conditions to generate instructions in real-time that get sent to the robot's motion controller.

The process described in some detail below simplifies robot motion path programming by eliminating many of the open-loop steps involved in typical robot path creation, and improves robustness of the overall system by providing real-time feedback of actual measurement data associated with the position and orientation of the end effector relative to the target object. The disclosed process significantly speeds up and simplifies the process for robot path planning using positional and orientational alignment of the end effector with the target object using multiple distance sensors. It also provides the ability to adapt to changes in the environment for improved robustness of process. Optionally, a localization process can be utilized to register the NDI scan data with the coordinate system of target object for maintenance/repair use, as well as to record location information for archival purposes. The proposed system also enables the use of sensor feedback for robot motion planning without the need for on-line or off-line motion programming. This reduces path planning preparation time and the need for operators with specialized training.

For the purpose of illustration, systems and methods for inspecting fuselage sections made of composite material (e.g., a composite laminate made of fiber-reinforced plastic) using active infrared thermography will be described in some detail. Active (i.e., pulsed) infrared thermography is one method used in the aerospace and power generation industries to nondestructively evaluate structural components for sub-surface defects. However, the end effector alignment concepts disclosed herein are not limited in their application to circumstances wherein an infrared thermography scanner is mounted to the end effector. The alignment process disclosed herein may also be used to align other types of NDI sensors (such as ultrasonic transducer arrays or eddy current sensors) or non-NDI tools mounted to an end effector.

In accordance with some embodiments that use an infrared thermography (IRT) scanner, the system comprises a vertical extension arm with a rotating wrist and modular tool mount, in addition to alignment sensor elements, provides a compact and relatively low-cost platform that can reach required areas around the fuselage with a minimal ground footprint. In one preferred embodiment, the vertical extension arm is rigidly coupled to a holonomic-motion base platform and an IRT scanner comprising an infrared camera and at least one flash lamp is attached to the end effector.

Although various embodiments of systems and methods for controlling the location of an end effector of a robot relative to a target object will be described in some detail below, one or more of those embodiments may be characterized by one or more of the following aspects.

One aspect of the subject matter disclosed in detail below is a method for controlling the location of an end effector of a robotic mobile platform relative to a target object, comprising: moving the end effector to a first location (e.g., a starting location) and enabling a robot controller to execute operations specified by a finite-state machine control application, which operations comprise: acquiring distance data from first, second and third distance sensors mounted to the end effector while the end effector is at the first location, wherein the acquired distance data represents respective distances separating the first, second and third distance sensors from respective areas on a surface of the target object; and moving the end effector from the first location to a first grid location by aligning the end effector with the target object using the distance data. In accordance with some embodiments, the aligning comprises rotating the end effector so that an axis of the end effector is perpendicular to the surface of the target object and displacing the end effector so that the end effector is separated from the surface of the target object by a goal offset distance.

The method described in the preceding paragraph may further comprise: calculating coordinates of a location of an external tracking system in a coordinate system of the target object, and then aiming a laser beam produced by the external tracking system at a specified coordinate position on the surface of the target, thereby forming a laser spot. In this instance, moving the end effector to the first location comprises driving the robotic mobile platform to align laser spots produced by the first, second and third distance meters around the laser spot produced by the external tracking system. The method may further comprise calculating coordinates of a tool mounted to the end effector in the coordinate system of the target object using the external tracking system while the end effector is at the first grid location.

Another aspect of the subject matter disclosed in detail below is a robotic mobile platform comprising: a self-propellable mobile base platform comprising a plurality of rolling elements and a plurality of motors respectively coupled to said plurality of rolling elements; a vertically extendible mast carried by the base platform; an arm having a proximal end fixedly coupled to the vertically extendible mast; an end effector pivotably coupled to a distal end of the arm; a non-transitory tangible computer-readable storage medium in which a finite-state machine control application is stored; first, second and third distance sensors mounted to the end effector and configured to acquire distance data representing respective distances separating the first, second and third distance sensors from respective areas on a surface of a target object; and a controller configured to control operation of the first, second and third distance sensors and move the end effector relative to ground in accordance with the commands generated by the finite-state machine control application, wherein the finite-state machine control application comprises methods to generate instructions executable by the controller for moving the end effector using the distance data acquired by the first, second and third distance sensors.

A further aspect of the subject matter disclosed in detail below is a method for controlling the location of an end effector of a robotic mobile platform relative to a target object, comprising: enabling a robot controller to execute operations specified by a finite-state machine control application, which operations comprise: (a) moving the end effector to a nominal location not in contact with a surface of the target object in accordance with pre-stored grid pattern data representing a grid pattern; (b) acquiring distance data from first, second and third distance sensors mounted to the end effector while the end effector is at the unaligned location, wherein the acquired distance data represents respective distances separating the first, second and third distance sensors from respective areas on the surface of the target object; (c) moving the end effector from the unaligned location to an aligned location by aligning the end effector with the target object using the distance data; (d) activating a tool mounted to the end effector while the end effector is at the aligned location; and (e) repeating steps (a) through (d) for each one of a multiplicity of aligned locations of the grid pattern. In accordance with some embodiments, the aligning comprises rotating the end effector so that an axis of the end effector is perpendicular to the surface of the target object and displacing the end effector so that the end effector is separated from the surface of the target object by a goal offset distance.

Other aspects of systems and methods for control of the location of an end effector of a robot are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Figure 1:
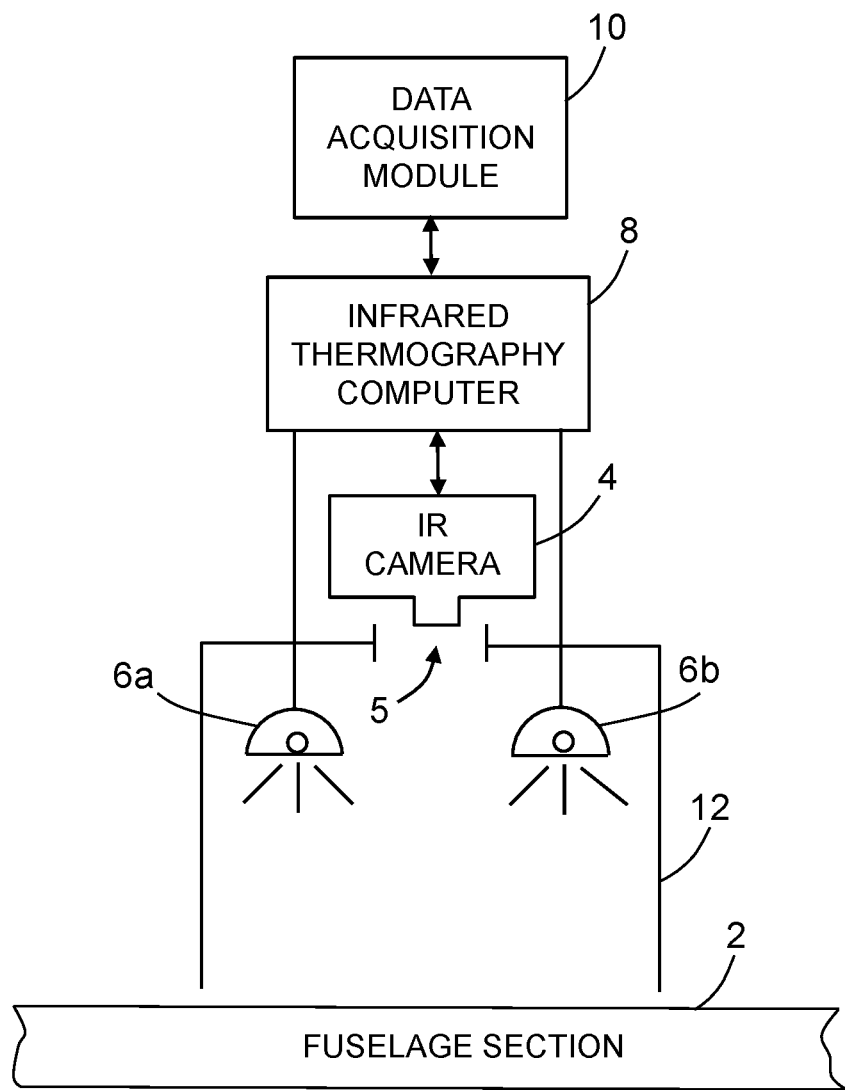
FIG. 1 is a block diagram identifying some components of a system for thermographic imaging of a fuselage section.

The process described in detail below provides a way to automate tasks like NDI scans over large surfaces, such as airplane fuselages. It also provides an easy-to-use, high-level interface that enables scan sequence definition with minimal instructions, which eliminates the need for custom path programming. The system described below has on-board feedback sensors for relative alignment to the target object, which does not require continuous feedback from external sensors. The solution involves techniques for acquiring distance measurement data, computing distance and angular alignment, and controlling the alignment process with a finite-state machine control application.

In addition, an independent localization process is also included to provide three-dimensional (3-D) location data for the scanned regions defined in the local coordinate system of the target object. This allows post processing of scanned data aligned with other reference information, such as 3-D computer aided design (CAD) models. Initial alignment of the scanning system with the target object can also be performed using the localization process.

For the purpose of illustration, systems and methods for non-destructive inspection of fuselage sections made of composite material (e.g., a composite laminate made of fiber-reinforced plastic) using active thermography will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Infrared thermography methods and devices make it possible to perform non-destructive testing of a material to detect defects, variations in the properties of the material, or differences in thickness of a coating or layer of the material. Infrared imaging can detect local variations in thermal diffusivity or thermal conductivity at or beneath the surface of the material. Infrared thermography can be used on metals, such as ferrous materials, including steel, or on non-metallic materials, such as plastics, ceramics, or composite materials.

Active thermography is used to nondestructively evaluate samples for sub-surface defects. It is effective for uncovering internal bond discontinuities, delaminations, voids, inclusions, and other structural defects that are not detectable by visual inspection of the sample. Generally, active thermography involves heating or cooling the sample to create a difference between the sample temperature and the ambient temperature and then observing the infrared thermal signature that emanates from the sample as its temperature returns to ambient temperature. An infrared camera is used because it is capable of detecting any anomalies in the cooling behavior, which would be caused by sub-surface defects blocking the diffusion of heat from the sample surface to the sample's interior. More particularly, these defects cause the surface immediately above the defect to cool at a different rate than the surrounding defect-free areas. As the sample cools, the infrared camera monitors and records an image time sequence indicating the surface temperature, thereby creating a record of the changes in the surface temperature over time.

Typically, the surface of the material is heated using a flash lamp and after a fixed period of time, a thermal image is taken of the surface of the heated material. Systems for thermographic heating typically employ xenon flashtubes and off-the-shelf photographic power supplies for sample excitation. An infrared camera images the infrared spectral radiance from the surface of the material, which is representative of the temperature of the surface of the material. Differences in temperature of the surface of the material indicate differing thermal characteristics of the material. These variations in thermal characteristics of the material indicate a possible material defect or the inclusion of a foreign material.

Structural thickness and stack-up geometry needed for infrared signature processing is obtained by knowing the exact location of the infrared camera's field of view on the surface of the fuselage section.

FIG. 1 is a block diagram identifying some components of a system for thermographic imaging of a fuselage section 2. This infrared thermographic inspection system comprises a digital infrared camera 4 having a lens that is directed through a camera lens aperture 5 in a hood 12, which is designed to form a hooded enclosure adjacent to the surface being inspected. A pair of flash lamps 6a and 6b are disposed inside and in fixed spatial relationship to the hood 12. The flash lamps 6a and 6b produce flashes of light in response to trigger signals from an infrared thermography computer 8, which also controls operation of the infrared camera 4. One example of a type of infrared camera 4 suitable for use with at least some of the embodiments disclosed herein includes a focal plane array (FPA) device configured to act as a spectral radiometer. Further details concerning other components that may be included in a flash lamp assembly of a type comprising an infrared camera, a pair of flash lamps and a hood can be found, for example, in U.S. Pat. No. 7,186,981.

In accordance with one method of thermographic inspection, first the flash lamps 6a and 6b are triggered to transfer heat to the composite material of the fuselage section 2. Preferably, during cooling of the composite material, the infrared camera 4 is triggered periodically to capture successive digital images of the varying spectral radiance of the heated portion of the fuselage section 2. Preferably, the thermally excited (heated) region of the composite material being inspected will cool monotonically after the excitation source removed until the sample reaches thermal equilibrium with its surroundings. The digital infrared imaging data captured by infrared camera 4 is received by the infrared thermography computer 8 for processing. The infrared thermography computer 8 is programmed to process infrared imaging data to detect and locate material edges, foreign objects under the surface of the material, or other material anomalies, such as delaminations and out-of-tolerance porosity. The infrared imaging data may be displayed on a display monitor (not shown in FIG. 1), which may be integrated with or separate from infrared thermography computer 8.

In accordance with the embodiment depicted in FIG. 1, the infrared thermography computer 8 may have digital image acquisition capabilities to convert the infrared imaging data from the infrared camera 4 to a format that can be analyzed and mathematically manipulated by the infrared thermography computer 8. An optional data acquisition module 10 may be incorporated in or separate from (as depicted in FIG. 1) the infrared thermography computer 8. The data acquisition module 10 may be used if the infrared camera 4 captures multiple spatially different images to generate a complete mosaic image of the surface of the composite structure when the latter is too large to fit in a single image frame. The infrared thermography computer 8 may be further programmed to analyze the infrared imaging data captured by the infrared camera 4. In particular, the time history of the surface temperature response of the fuselage section 2 as it returns to room temperature can be analyzed to detect the presence of defects in the composite material.

In the context of the specific application of inspecting fuselage sections, a non-destructive inspection system may comprise means for scanning the skin of the fuselage section from a vantage point external to the fuselage section. In the embodiments disclosed below, the external scanning means comprise a robot equipped with an infrared camera. The robot comprises a movable robot base and a robotic arm having a proximal end coupled to the robot base. The robot base may be a mobile holonomic crawler vehicle. An infrared thermography scanner is coupled to a distal end of the robotic arm. The infrared thermography scanner comprises an infrared camera and two or more flash lamps attached inside a hood. The hood may be sized to cover a square area on the outer surface of the fuselage section. The infrared imaging data acquired from adjacent square areas can be stitched together based on measurements of the respective locations of the robot base using a local positioning system. The stitching process may be performed on a real-time basis or may be performed at a later time.

Various embodiments of NDI systems configured to use the location alignment feedback concepts disclosed herein will now be described in some detail. In accordance with some embodiments, the NDI system is an automated platform with an end effector that is able to reach to the centerline of the top and bottom of the fuselage from either side of the airplane. This NDI system comprises a Mecanum-wheeled holonomic-motion base platform, a vertical extension mast carried by the base platform, a pivoting end effector, proximity sensors, and support for multiple types of NDI devices mounted on the end effector. The vertical support mast with a pivoting end effector on an extension arm allows the inspection of the full height of an airplane fuselage section. The holonomic-motion base platform allows the robot to quickly and efficiently re-position the NDI scanner unit along the length of the fuselage. Motion control software with distance sensor feedback enables automatic capture overlapping grid pattern scans. Reference position data is also captured to align the NDI scans with the appropriate airplane coordinate system. The system is relatively easy to set up and use in either the automated or manual control mode. It can be configured to accept various types of NDI units mounted to its end effector, including: eddy current, ultrasonic, and infrared thermography (IRT) NDI sensors.

Figure 2:
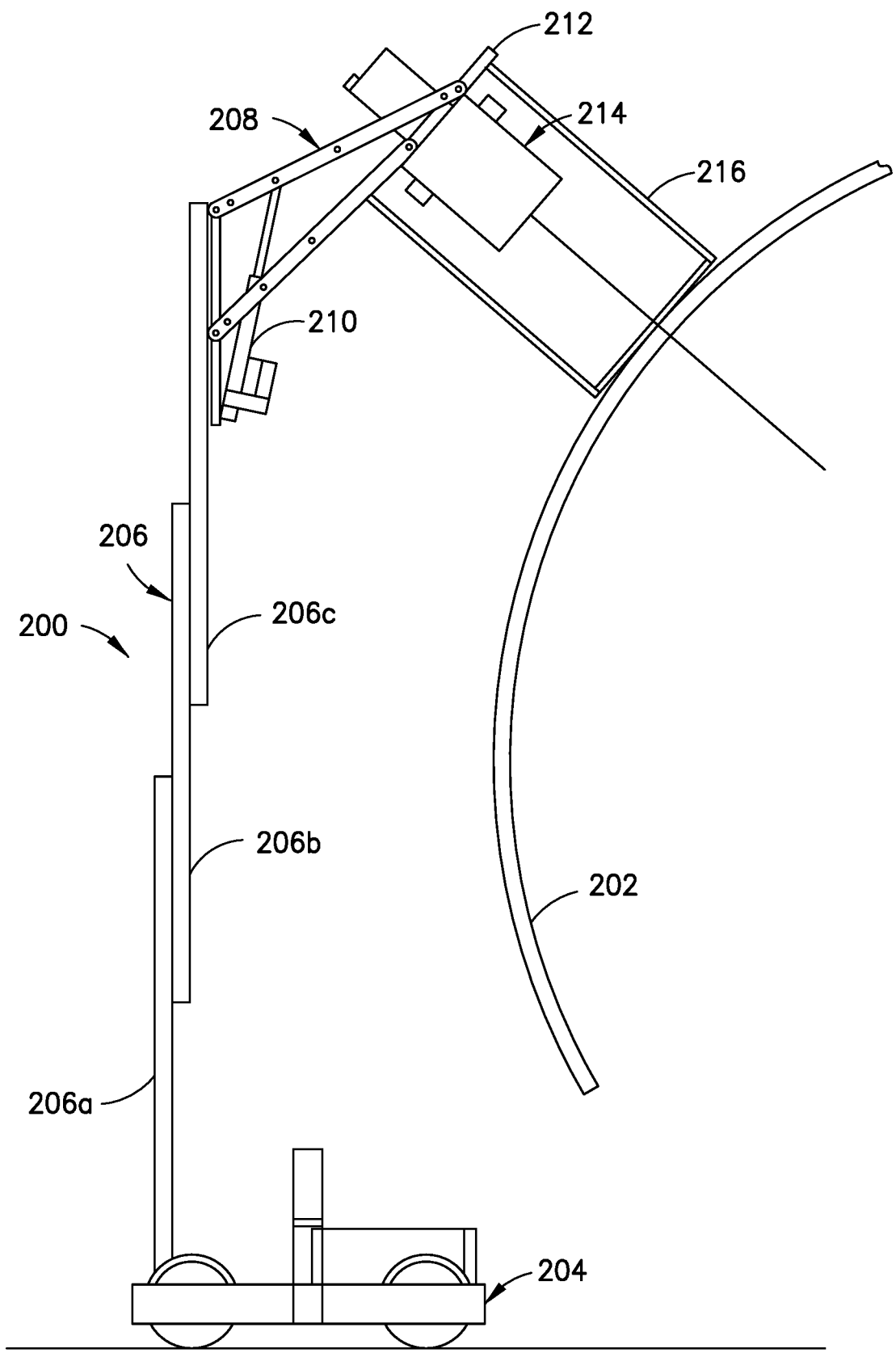
FIG. 2 is a diagram representing a side view of a ground-based robotic NDI mobile platform in accordance with one embodiment.

FIG. 2 is a diagram representing a side view of a ground-based robotic NDI mobile platform 200 in accordance with one embodiment. This platform comprises a holonomic-motion base platform 204, an infrared thermography (IRT) scanner 214, and an automated scanner support apparatus (carried by the holonomic-motion base platform 204) that is under the control of a robot controller (not shown). The automated scanner support apparatus comprises a vertical extendible mast 206 that can be extended and retracted as needed to change the elevation of the IRT scanner 214. The vertical extendible mast 206 comprises a first mast section 206a having a linear axis and one end fixedly coupled to a holonomic-motion base platform 204, a second mast section 206b having a linear axis and which is slidably coupled to the first mast section 206a for sliding along a line that is parallel to the axis of the first mast section 206a, and a third mast section 206c having a linear axis and which is slidably coupled to the second mast section 206b for sliding along a line that is parallel to the axis of the second mast section 206b. In accordance with one implementation, the vertical extension of the mast is controlled by a single motor and a cable-pulley system.

The ground-based robotic NDI mobile platform 200 depicted in FIG. 2 further comprises a four-bar linkage arm mechanism 208 to control the position and orientation of an end effector 212 which is pivotably coupled to the distal end of the four-bar linkage mechanism. The driver link of the four-bar linkage mechanism 208 is driven to rotate relative to the third mast section 206c by a motor-driven lead screw or hydraulic cylinder 210. The IRT scanner 214 is mounted to and rotates with the end effector 212. An IRT shroud 216 surrounds the IRT scanner 214 to isolate the volume of space between the IRT scanner 214 and a curved workpiece 202 (e.g., a fuselage section) from the surrounding environment.

Figure 3:
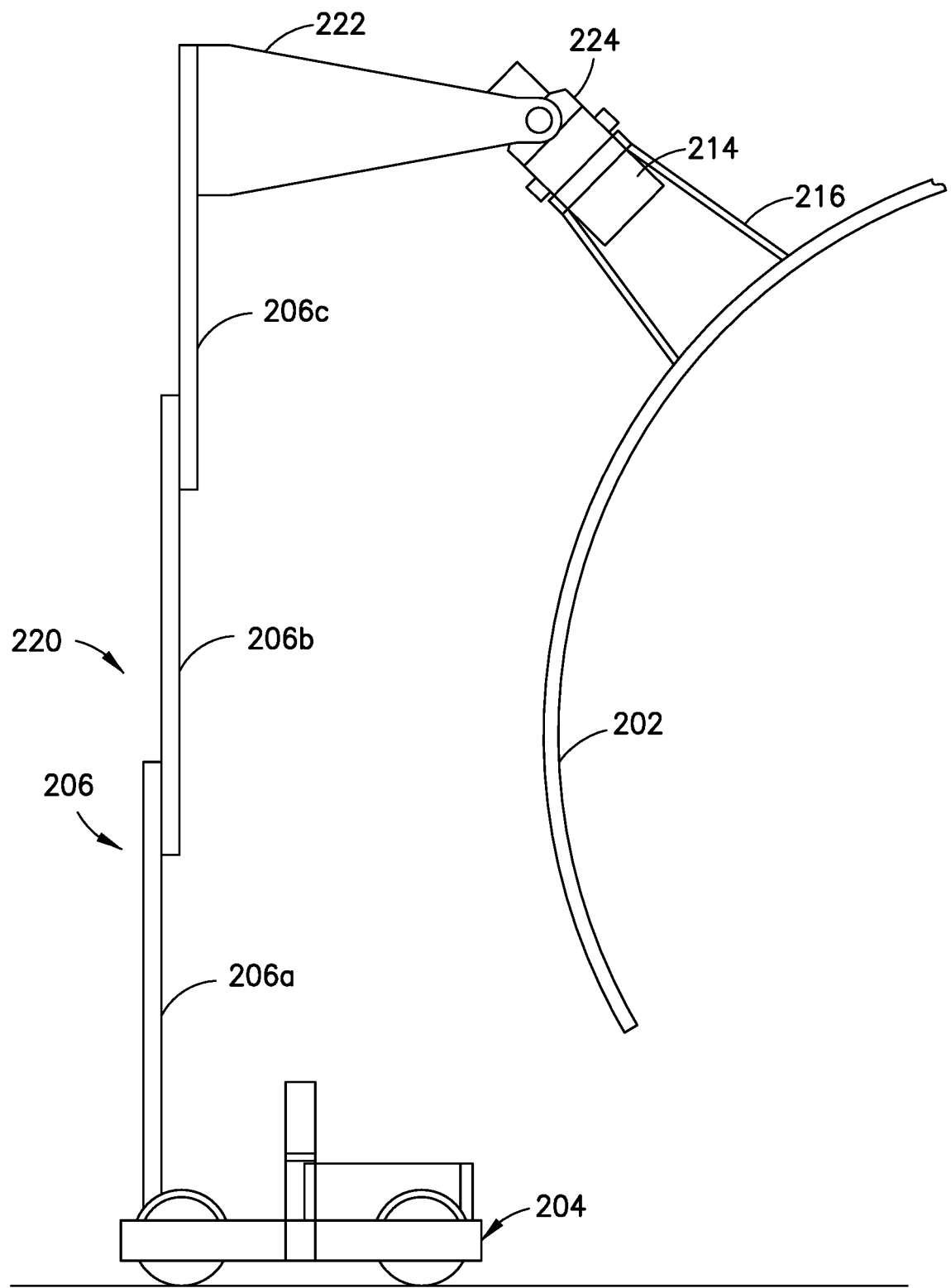
FIG. 3 is a diagram representing a side view of a ground-based robotic NDI mobile platform in accordance with another embodiment.
Figure 4:
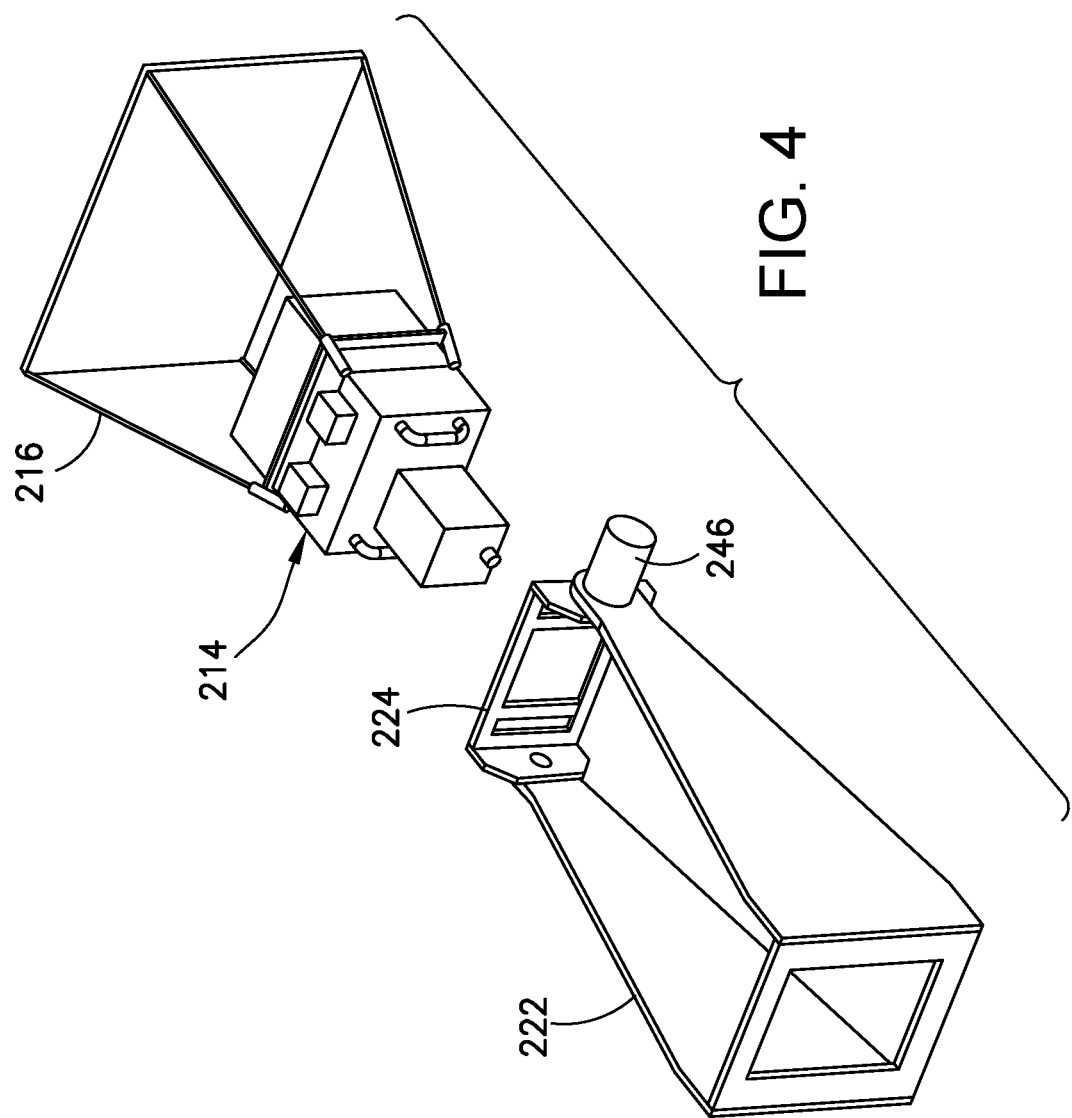
FIG. 4 is a diagram representing an exploded view of some components of the robotic NDI mobile platform depicted in FIG. 3.

FIG. 3 is a diagram representing a side view of a ground-based robotic NDI mobile platform 220 in accordance with another embodiment. This embodiment comprises a vertical extendible mast 206, a rigid extension arm 222 fixedly coupled to the third mast section 206c, and an end effector 224 pivotably coupled to the distal end of the two sides of the rigid extension arm 222. FIG. 4 is a diagram representing an exploded view of some components of the robotic NDI mobile platform 220 depicted in FIG. 3. This embodiment has independent programmable control over the extension height as well as the end effector pitch. Pitch rotation of the end effector 224 can be driven by a position control motor 246 (see FIG. 4) with a non-back-drivable gearbox (not shown).

Figure 5:
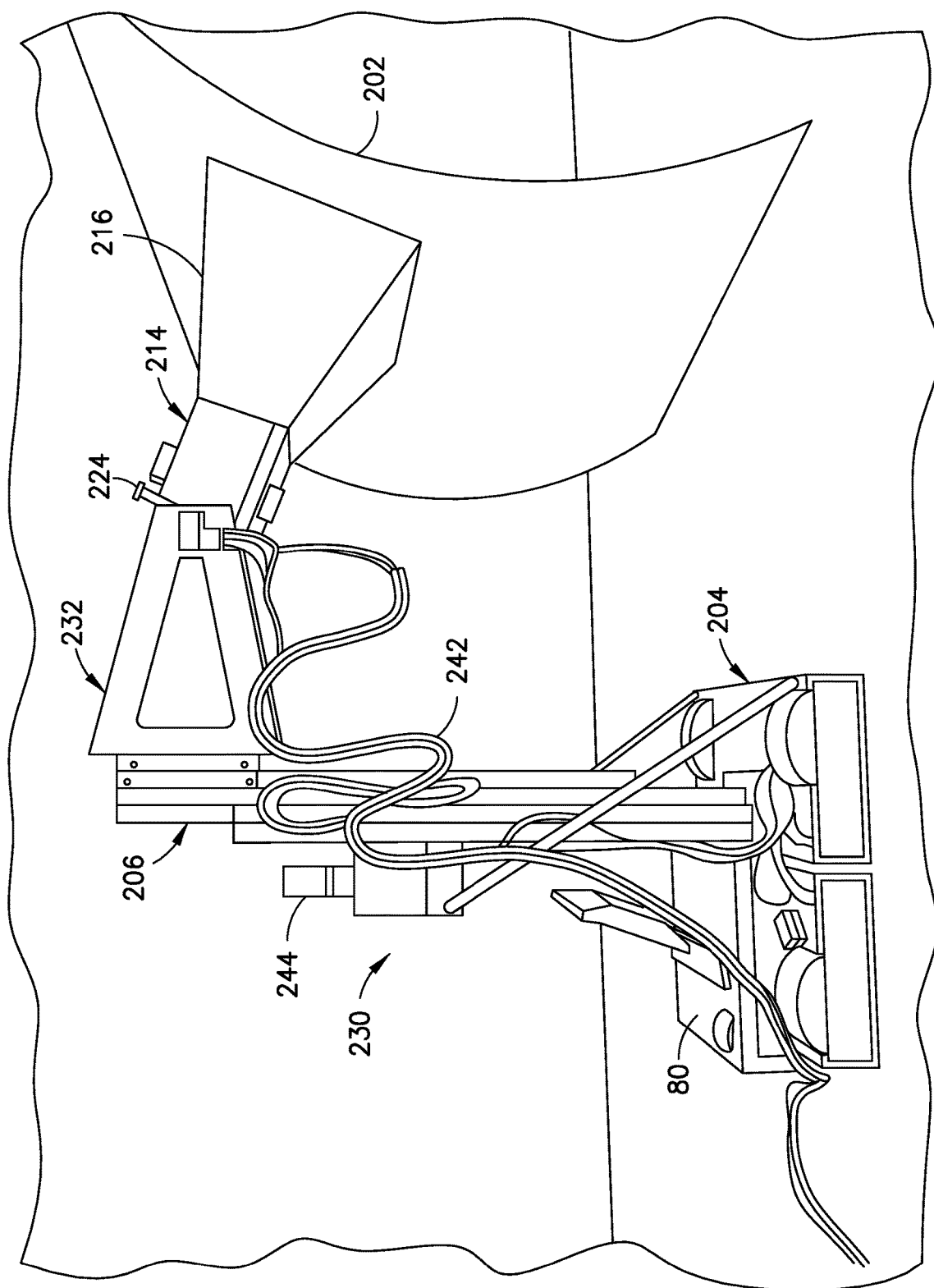
FIG. 5 is a diagram representing a perspective view of a ground-based robotic NDI mobile platform in the process of scanning a curved workpiece made of composite material. (Laser range meters mounted to the robot end effector are not shown in FIG. 5, but are shown in FIG. 6.)

FIG. 5 is a diagram representing a perspective view of a prototype of a ground-based robotic NDI mobile platform 230 in the process of scanning a curved workpiece 202 made of composite material. The IRT scanner 214 is mounted to an end effector 224, which end effector 224 in turn is pivotable about a pitch axis under the control of a robot controller 80. The end effector 224 is pivotably coupled to a rigid extension arm 232 which is in turn fixedly coupled to the uppermost mast section of the vertical extendible mast 206. The IRT scanner 214 sends acquired data to an infrared thermography computer (not shown in FIG. 5) by way of an electrical cable 242. The robotic NDI mobile platform 230 is also equipped with a warning light 244 which switches on and off when the system is enabled.

In accordance with one proposed implementation, the holonomic-motion base platform 204 employs four Mecanum wheels arranged with a Type A pair on one diagonal and a Type B pair on the other. The Type A Mecanum wheels differ from the Type B Mecanum wheels in that the tapered rollers of the former are oriented at different angles than the tapered rollers of the latter. Each Mecanum wheel can be driven to rotate by a respective independently controlled stepper motor. A Mecanum-wheeled vehicle can be made to move in any direction and turn by controlling the speed and direction of rotation of each wheel. For example, rotating all four wheels in the same direction at the same rate causes forward or backward movement; rotating the wheels on one side at the same rate but in the opposite direction of the rotation by the wheels on the other side causes the vehicle to rotate; and rotating the Type A wheels at the same rate but in the opposite direction of the rotation of the Type B wheels causes sideways movement. The holonomic-motion base platform 204 moves under the control of an onboard control computer (i.e., robot controller). The structure and function of a suitable Mecanum-wheeled holonomic-motion base platform is described in U.S. Pat. No. 9,410,659, the disclosure of which is incorporated by reference herein in its entirety.

In accordance with one embodiment, a multiplicity of sensors (not shown FIG. 5) are mounted around the periphery of the holonomic-motion base platform 204 to indicate the presence of obstacles in that specific region of the vehicle. The motion controller uses that sensor data to block additional motion from occurring in the direction associated with that particular sensor, but motion in the other directions is still allowed. Potential sensors include contact sensors, thru-beam sensors, and proximity sensors. This collision avoidance system would operate in a similar manner similar to what is described in U.S. Pat. No. 7,194,358.

As previously mentioned, the location alignment feedback process disclosed herein employs distance sensors to determine the position and orientation (i.e., the location) of the IRT scanner 214 relative to the target object (e.g., workpiece 202). At least three non-collinear distance measurement devices can be used to compute relative location in real-time. To mitigate any possibility of scratching the surface of the target object, laser range meters were selected instead of contact probes for use as distance sensors. In addition to close-range distance and angle guidance, the laser range meters also provide the advantage of longer range distance feedback to the platform motion controller for general navigation purposes.

Figure 6:
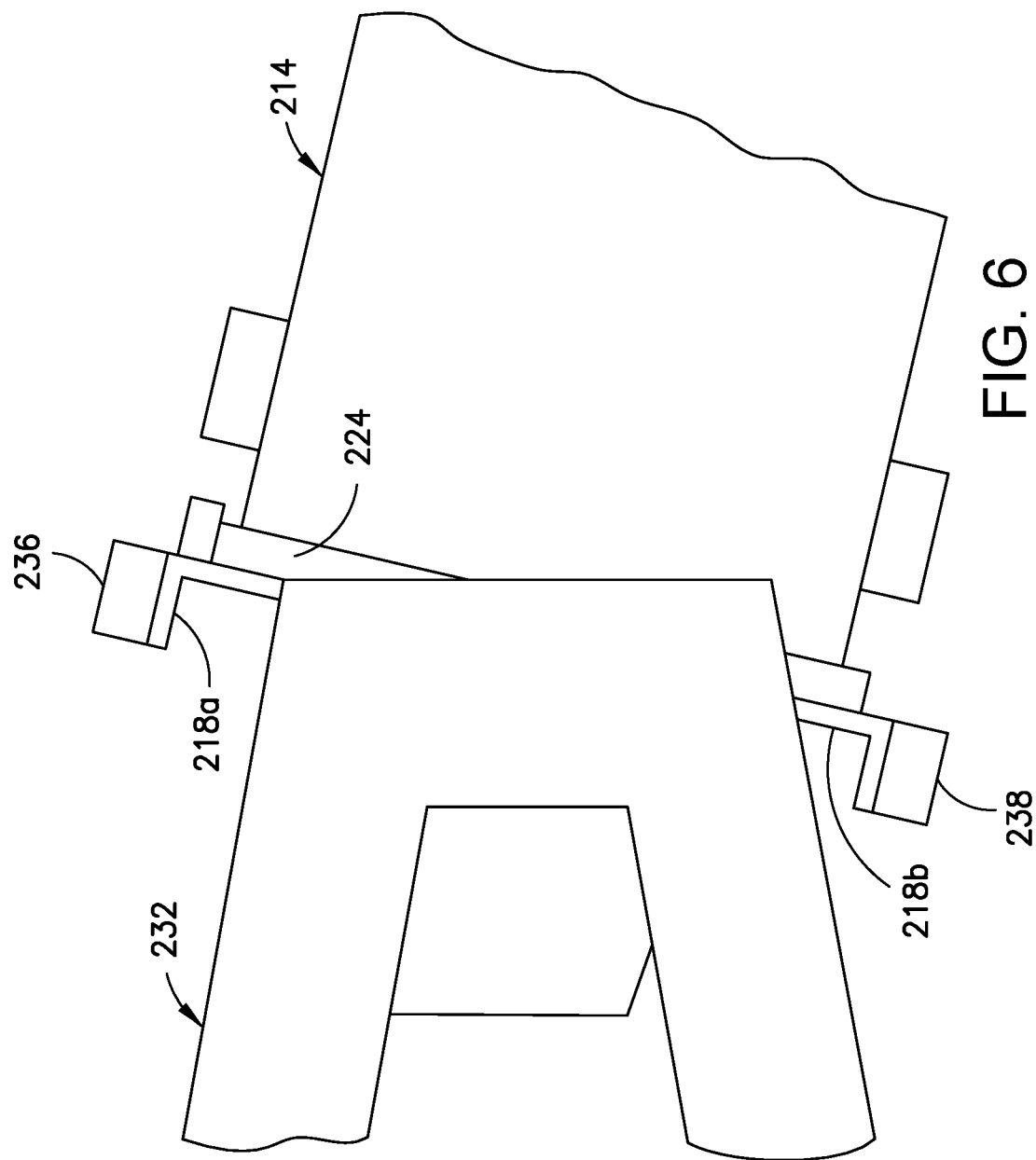
FIG. 6 is a diagram representing a side view of a portion of the robotic NDI mobile platform depicted in FIG. 5, which portion includes the end effector and three laser range meters mounted to the end effector.

In accordance with one implementation, three laser range meters (not shown in FIG. 5) are mounted to the end effector 224. FIG. 6 is a diagram representing a side view of a portion of the robotic NDI mobile platform depicted in FIG. 5, which portion includes the end effector 224 and three laser range meters mounted to the end effector 224. Only two of the three laser range meters (i.e., laser range meters 236 and 238) are visible in FIG. 6. The third laser range meter (i.e., laser range meter 240) is visible in FIG. 7. As seen in FIG. 6, the first laser range meter 236 is attached to an L-shaped mounting plate 218a, which is in turn attached to the end effector 224. Similarly, the second laser range meter 238 is attached to an L-shaped mounting plate 218b (shown in FIGS. 6 and 7), which is in turn attached to the end effector 224; and the third laser range meter 240 is attached to an L-shaped mounting plate 218c (shown in FIG. 7), which is in turn attached to the end effector 224.

Figure 7:
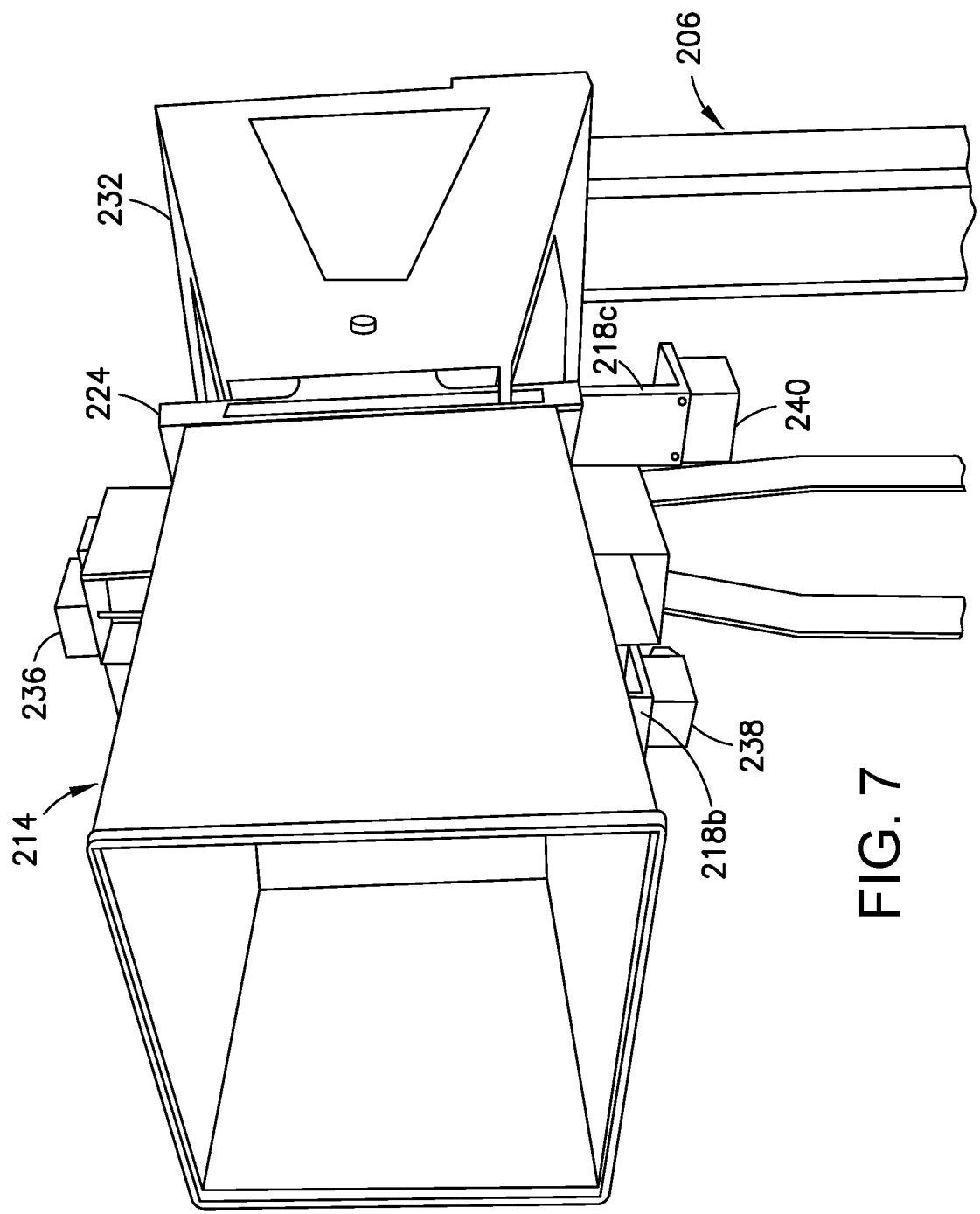
FIG. 7 is a diagram representing a perspective view of an infrared thermography scanner mounted to the end effector of the robotic NDI mobile platform depicted in FIG. 5.
Figure 8:
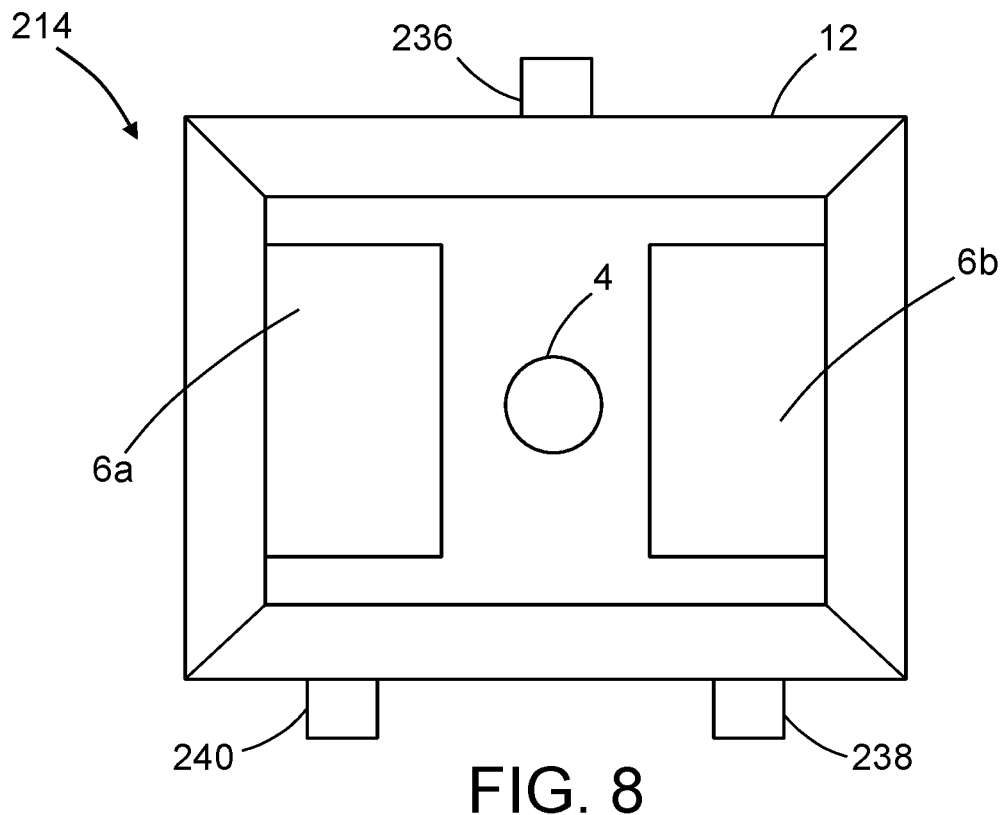
FIG. 8 is a diagram representing a front view of the infrared thermography scanner depicted in FIG. 7.
Figure 15A:
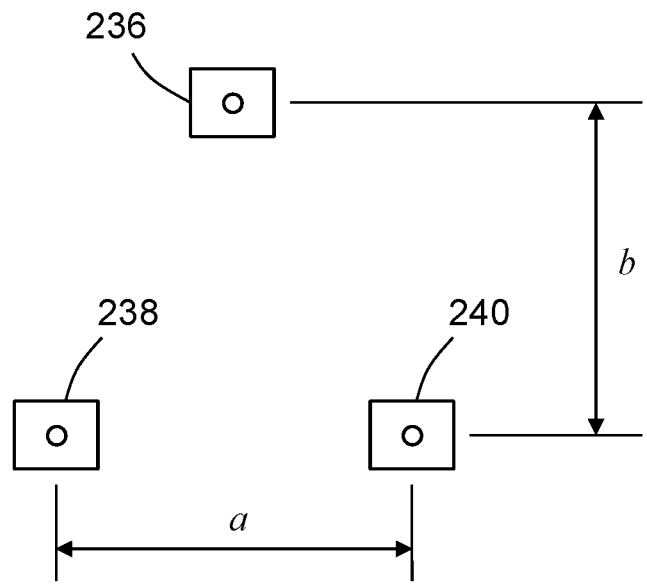
FIGS. 15A through 15C are diagrams representing front, side and top views respectively of three laser range meters arranged in a triangular pattern in a common plane and directed at respective spots on a surface of a target object, the laser range meters and spots being separated by respective distances.

FIG. 7 is a diagram representing a perspective view of the IRT scanner 214 (with shroud 216 removed) mounted to the end effector 224, which in turn is pivotably coupled to the rigid extension arm 232. As previously described, laser range meters 236, 238 and 240 are mounted to the end effector 224. As best seen in the front view of FIG. 8, laser range meter 236 is mounted at an elevation which is higher than the elevation of the highest point of the hood 12 of the IRT scanner 214, whereas the laser range meters 238 and 240 are mounted at an elevation which is lower than the elevation of the lowest point of the hood 12 of the IRT scanner 214, separated by a distance. Preferably the laser range meters 236, 238 and 240 are disposed at the vertices of an isosceles triangle. FIG. 15A shows an arrangement wherein the distance separating the laser range meters 238 and 240 (i.e., the base of the isosceles triangle) is a and the distance separating the laser range meter 236 and a point midway between the laser range meters 238 and 240 (i.e., the height of the isosceles triangle) is b.

The system depicted in FIGS. 5-7 uses an on-board alignment system to determine relative location (position and orientation) offsets of the end effector 224 to a target object. This process uses distance information from the laser range meters 236, 238 and 240 to compute relative location in real-time. The system then provides that data to a robot controller to produce the desired feedback-based motion of the end effector 224 (which may also include motion control of other parts of the robot).

One form of control that this process enables is semi-automated control to assist an operator in some aspect of alignment, such as orientation of the end effector 224 to make sure that it is always perpendicular to the surface of the target object or making sure that it is always a specific distance from the surface.

Figure 9:
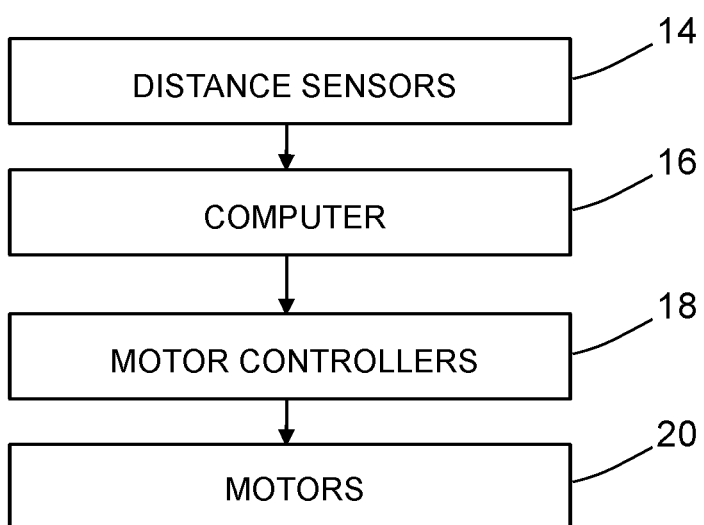
FIG. 9 is a block diagram identifying some components of an alignment system in accordance with some embodiments.

FIG. 9 is a block diagram identifying some components of an alignment system in accordance with some embodiments. The distance sensors 14 (e.g., laser range meters 236, 238 and 240) provide distance information to a computer 16 (e.g., a robot controller). The computer 16 is configured (e.g., programmed) to determine what movements are needed to align the end effector 224 with the surface of the target object based on the distance information received from the distance sensors 14. These movements may include one or more of the following: moving the holonomic-motion base platform 204 to a new location; extending or retracting the vertical extendible mast 206; and pivoting the end effector 224 about the pitch axis. The robotic NDI mobile platform comprises a multiplicity of motors 20 which are controlled by respective motor controllers 18. The computer 16 sends command signals to selected motor controllers 18 to activate the robotic movements needed to align the end effector 224 with the surface of the target object.

Figure 10:
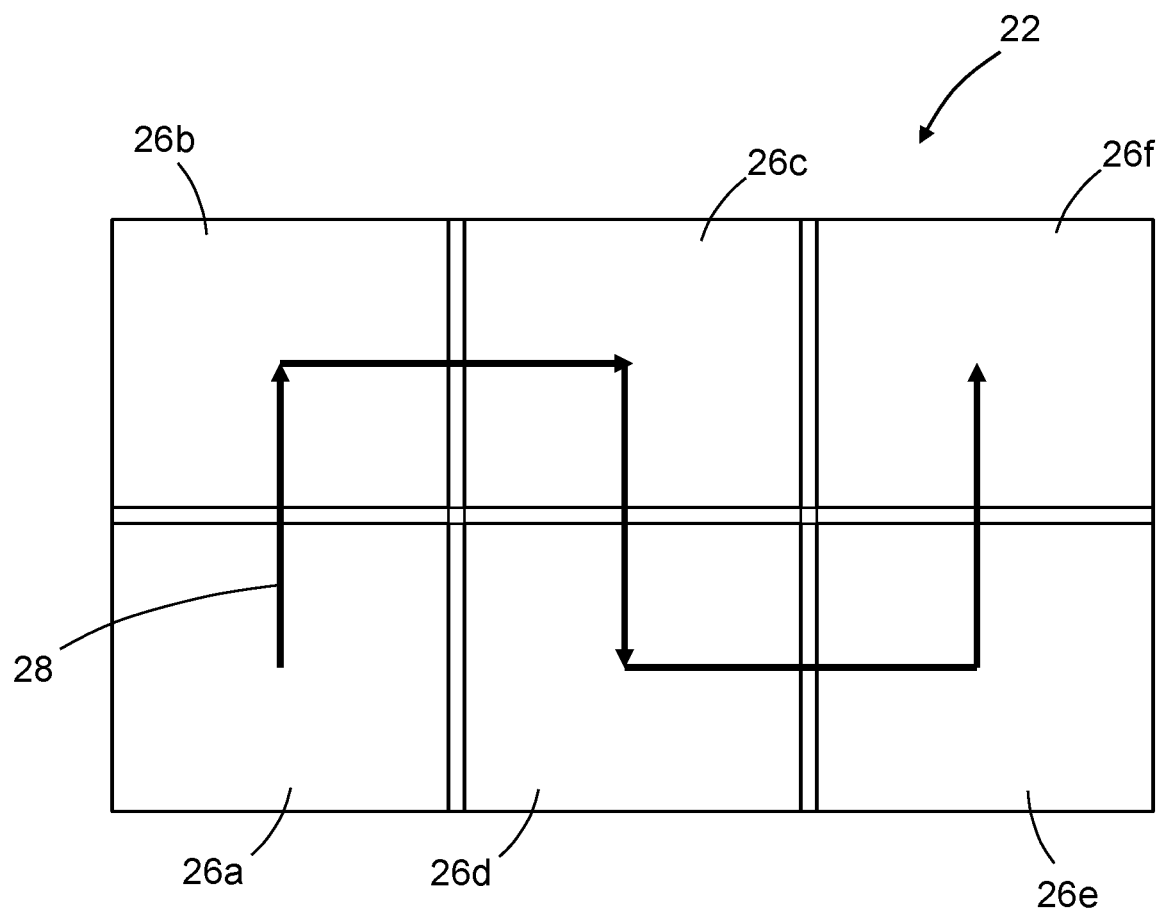
FIG. 10 is a diagram representing a scan pattern (3×2) for IRT inspection of a large workpiece.

Another form of control enabled by this process is fully automated motion control, where the operator specifies a high-level goal, such as an m×n grid pattern, and then the automated controller does the motion planning based on the high-level goal and feedback from the alignment system. For example, FIG. 10 is a diagram representing a 3×2 scan pattern 22 for IRT inspection of a large workpiece. First the IRT scanner acquires IRT data for scan area 26a. Then the IRT scanner is moved upward and stopped at a location where it acquires IRT data for scan area 26b. Preferably scan area 26b overlaps scan area 26a slightly to facilitate stitching the scans together and ensure that there are no gaps in the coverage. Next the IRT scanner is moved rightward and stopped at a location where it acquires IRT data for scan area 26c. Then the IRT scanner is moved downward and stopped at a location where it acquires IRT data for scan area 26d, followed by a move rightward to acquire IRT data for scan area 26e, and then a move upward to acquire IRT data for scan area 26f. The scan path 28 of the IRT scanner during this process is indicated by arrows in FIG. 10.

The alignment process provides an alternative to directly programming the individual motions of the robot. It also enables the system to adapt to unexpected changes in the environment, as well as providing collision avoidance ability for the end effector to achieve the desired position and orientation relative to the target surface without contacting it.

The automated process used here is based on a finite-state machine control application that manages the transition from one state to another based on external inputs. This framework enables the system to produce responses based on multiple types of inputs and the current state of the system. The various actions of the system needed to produce the automatically generated motion path plan and scanner control signals are based on satisfying the criteria necessary for transitions between one mode of operation and another. In accordance with one embodiment, a finite-state machine uses sensor feedback to trigger transitions between discrete sets of system states.

Figure 11:
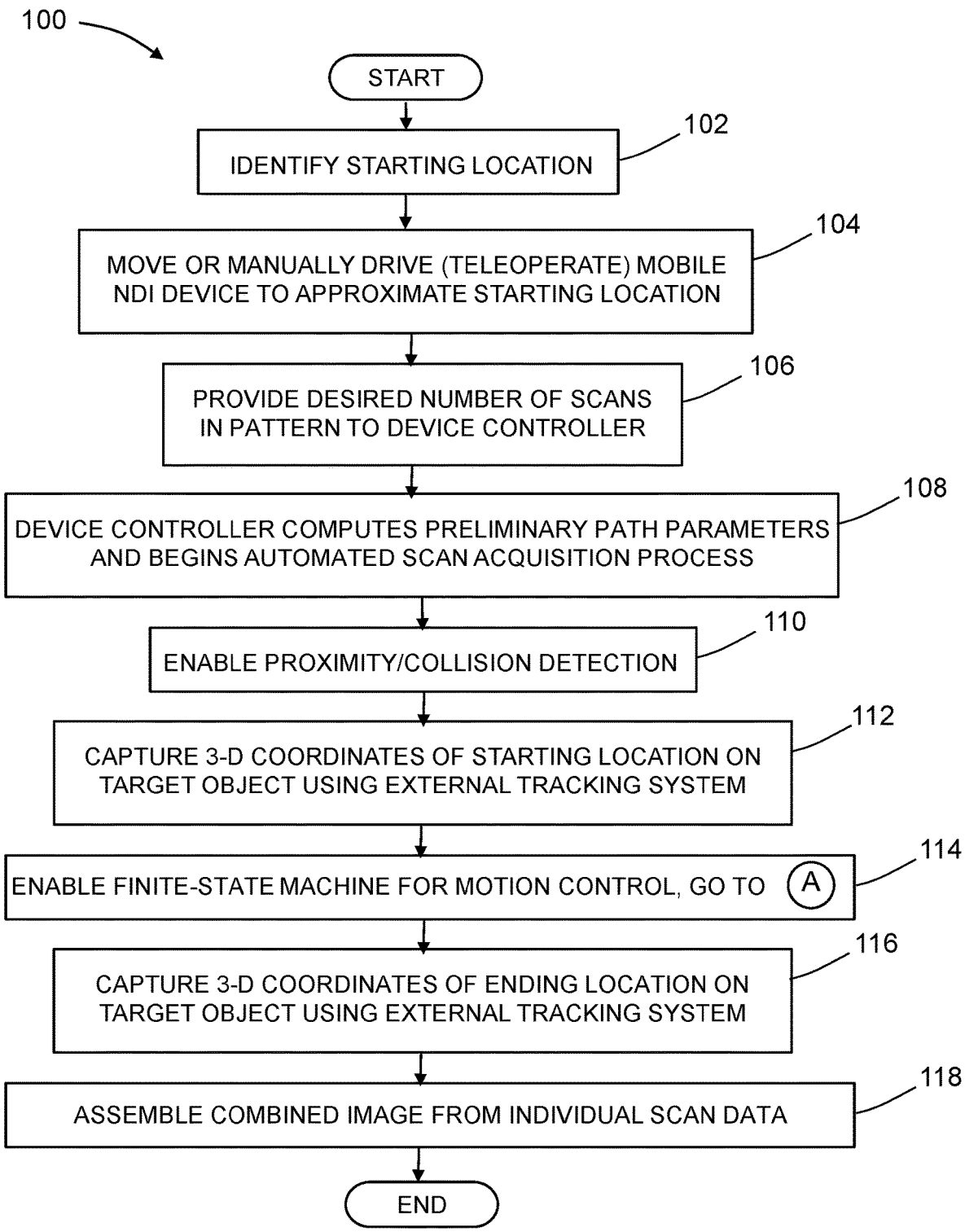
FIG. 11 is a flowchart identifying some steps of a method of non-destructive inspection that employs an end effector alignment process in accordance with one embodiment.
Figure 11A:
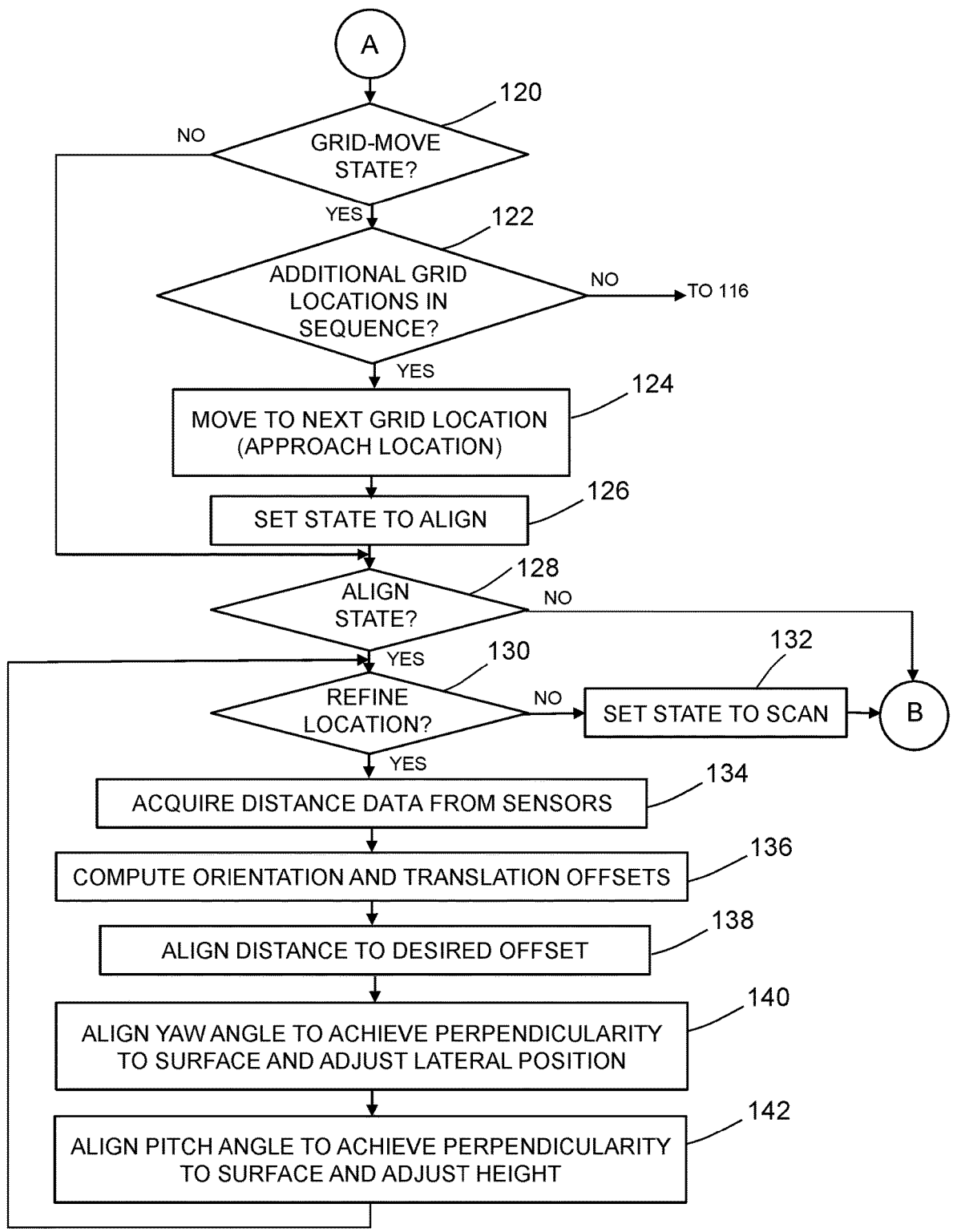
FIGS. 11A and 11B (in conjunction) form a flowchart identifying some steps performed by the alignment process finite-state machine employed in the method depicted at a high level in FIG. 11.
Figure 11B:
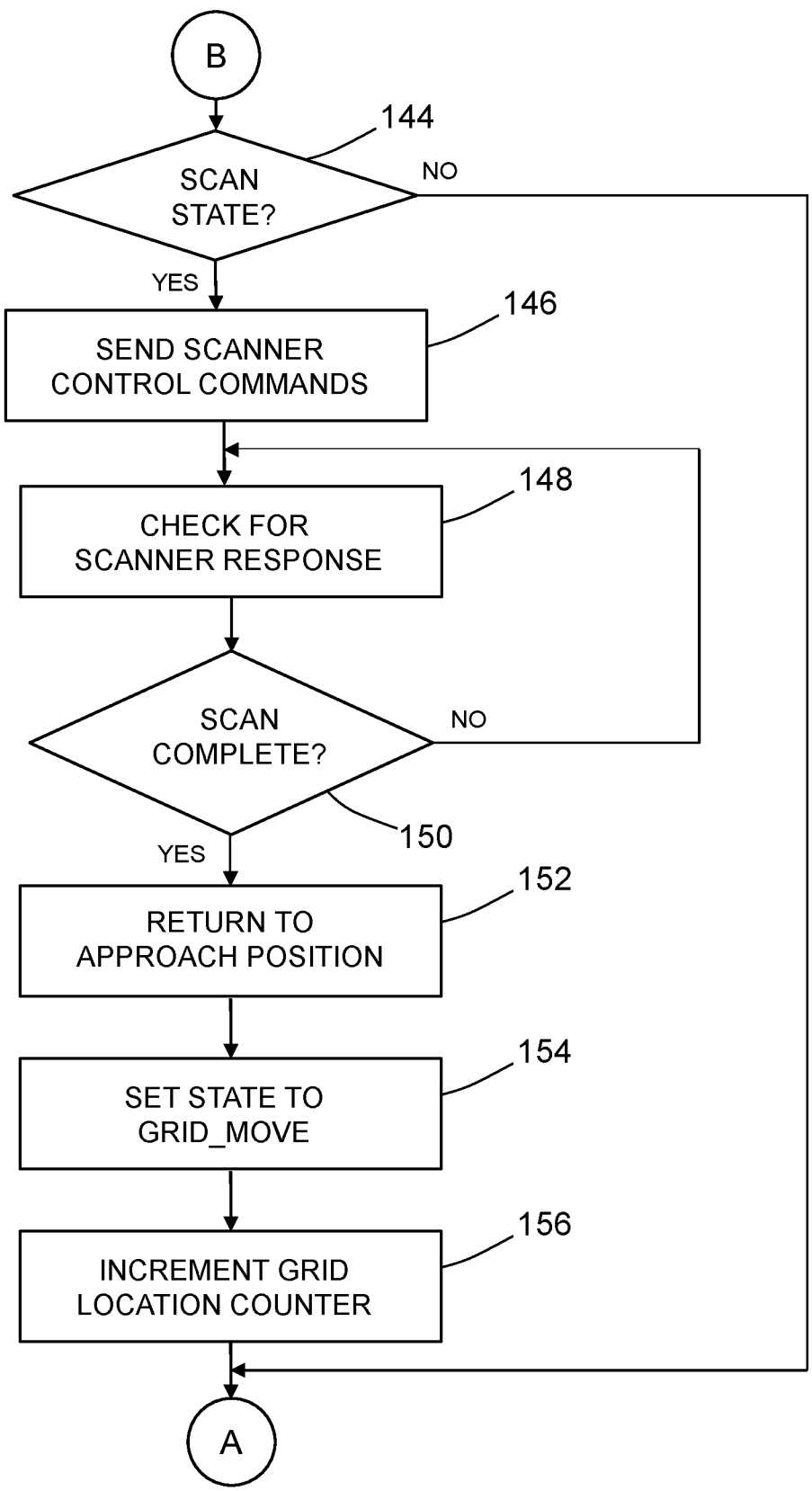

The process will now be described with reference to a robotic NDI mobile platform comprising a base platform (e.g., a holonomic-motion base platform) carrying a robotic arm having an NDI sensor (e.g., an IRT scanner) at its distal end, the movements of the base platform and the robotic arm being controlled by a device controller (e.g., a robot controller). FIG. 11 shows the high-level process for the overall operation of the system, and FIGS. 11A and 11B show the details associated with the alignment-bases aspects of the process. Digital signals sent between the robot controller and the NDI sensor control computer (e.g., infrared thermography computer 8 identified in FIG. 1) enable synchronization between the separate robot and NDI sensor systems.

FIG. 11 identifies some steps of a method 100 of nondestructive inspection that employs an end effector alignment process in accordance with one embodiment. To start the process, the system operator identifies a first location for the NDI sensor relative to the target object (step 102). This step can be accomplished by visual methods (by the operator), or automatically (with a pointing system like the LPS). Then the system operator can operate the base platform and robotic arm to move the NDI sensor to the approximate first location (step 104). The system operator provides the desired number of scans in the pattern to the device controller in step 106. This number will be compared to a count stored in a grid location counter, which counter is incremented each time a scan in the pattern is acquired. In step 108, the device controller computes preliminary path parameters and begins automated scan acquisition. The system operator also enables proximity/collision detection (step 110). Then the system operator captures the 3-D coordinates of the first location using an external tracking system (e.g., an LPS) (step 112). (The external tracking system has been previously calibrated so that its own 3-D coordinates relative to the coordinate system of the target object are known, which allows the LPS computer to compute the 3-D coordinates of the first location relative to the coordinate system of the target object.) Thereafter a finite-state machine for controlling the motion of the NDI sensor during the alignment process and during the scanning process is enabled (step 114) (i.e., go to A in FIG. 11A). (The finite-state machine will be described in the next paragraph with reference to FIGS. 11A and 11B.) After the NDI sensor has been aligned and the scan pattern has been completed, the system operator captures the 3-D coordinates of the ending location of the NDI sensor using the external tracking system (step 116). A combined image can then be assembled by stitching together the scan data from adjoining scans (step 118).

FIGS. 11A and 11B (in conjunction) form a flowchart identifying some steps performed by the finite-state machine employed in the method depicted at a high level in FIG. 11. A finite-state machine is a mathematical model of a process that can only be in one of a finite number of states at any given time.

In accordance with one proposed implementation, the robot controller first checks (i.e., determines) whether the finite-state machine (FSM) is set to the GRID-MOVE state or not (step 120). GRID_MOVE is the state where the robot is moving between the grid locations which are defined at a high level. For example, if the system operator wants the system to capture data in a 3×2 pattern, the robot will move along the scan path 28 seen in FIG. 10 to make a contiguous grid. If the robot controller determines in step 120 that the FSM is not in the GRID-MOVE state, the robot controller then proceeds directly to step 128. If the robot controller determines in step 120 that the FSM is in the GRID-MOVE state, the robot controller then determines whether there are additional grid locations in the sequence (step 122). This is accomplished by comparing the current count in the grid location counter to the preset number of scans to be acquired. If the robot controller determines in step 122 that there are no additional grid locations (i.e., the count equals the present number) in the sequence, the process returns to step 116 in FIG. 11. If the robot controller determines in step 122 that there are additional grid locations in the sequence (i.e., the count is less than the preset number), the robot moves to the next location of the unaligned NDI sensor (step 124), following which the state of the finite-state machine is set to ALIGN (step 126). In the next step, the robot controller determines whether the finite-state machine is set to the ALIGN state or not (step 128).

The ALIGN state is when the robot is using the three distance sensors to ensure that the pitch and yaw of the end effector are such that the aim axis of the NDI scanner is perpendicular to the surface of the target object. If the robot controller determines in step 128 that the finite-state machine is not in the ALIGN state, then the robot controller proceeds directly to step 144 in FIG. 11B. If the robot controller determines in step 128 that the finite-state machine is in the ALIGN state, then the robot controller determines whether the location of the NDI sensor needs to be refined or not (step 130). If the robot controller determines in step 130 that the location of the NDI sensor does not need to be refined (i.e., the aim axis of the NDI scanner is perpendicular to the surface of the target object), then the robot controller sets the state of the finite-state machine to SCAN (step 132) and proceeds directly to step 144 in FIG. 11B. If the robot controller determines in step 130 that the location of the NDI sensor does need to be refined (i.e., the aim axis of the NDI scanner is not perpendicular to the surface of the target object), then the robot controller performs the following steps in order: (a) acquires distance data from the distance sensors (step 134); (b) computes the orientation and translation offsets from the desired aligned location (step 136); (c) align the distance to the desired offset (step 138); (d) aligns the yaw angle of the end effector to achieve perpendicularity to the surface of the target object and adjust lateral position (step 140); (e) aligns the pitch angle of the end effector to achieve perpendicularity to the surface of the target object and adjust height (step 142); and (f) returns to step 130.

As previously described, if the robot controller determines in step 130 that the location of the NDI sensor does not need to be refined, then the robot controller sets the state of the finite-state machine to SCAN (step 132) and proceeds directly to step 144 in FIG. 11B. In step 144, the robot controller determines whether the finite-state machine is set to the SCAN state or not. If the robot controller determines in step 144 that the finite-state machine is not in the SCAN state, then the robot controller returns to step 120 in FIG. 11A. If the robot controller determines in step 144 that the finite-state machine is in the SCAN state, then the robot controller sends scanner control commands (step 146) to the NDI scanner control computer (e.g., infrared thermography computer 8 identified in FIG. 1). The robot controller then checks for a scanner response (step 148) and determines whether the scan pattern has been completed or not (step 150). If the robot controller determines in step 150 that the scan pattern has not been completed, then the robot controller returns to step 148. If the robot controller determines in step 150 that the scan pattern has been completed, then the robot controller performs the following steps in order: (a) returns the NDI scanner to the location (step 152); (b) sets the state of the finite-state machine to GRID MOVE (step 154); (c) increments the grid location counter (step 156); and (d) returns to step 120 in FIG. 11A.

After the automated scanning sequence is complete, the individual images from each IRT scan can then be stitched together to produce a single representation of the inspection region.

The above-described system may have many potential use cases for general alignment tasks of robotic manipulators or other devices. One of these use cases is for grid-based NDI scan acquisition in aerospace manufacturing and maintenance environments, e.g., grid-based scanning of an airplane fuselage.

During typical operation, this system can be driven (teleoperated) by a user to an approximate first location, after which it is set to automatically acquire grid scans arranged in an operator-defined vertical and horizontal pattern along either side of the airplane fuselage, as shown in FIG. 10.

The automated grid scanning feature of the motion control algorithm involves feedback of distance data from three laser range meters 236, 238 and 240 to the motion control algorithm, which sets the horizontal and vertical placement, as well as the yaw and pitch orientation of the platform 204 and end effector 224, respectively. This approach eliminates the need for individual pre-defined motion paths for the system, which simplifies usage and reduces setup time.

The system can also be fully controlled in a teleoperation mode to allow operators to acquire data manually. A semi-automated mode is also possible, where the system operator controls the platform location and mast height, and the system automatically adapts the end effector pitch orientation to maintain a perpendicular alignment with the surface in front of it.

Figure 12:
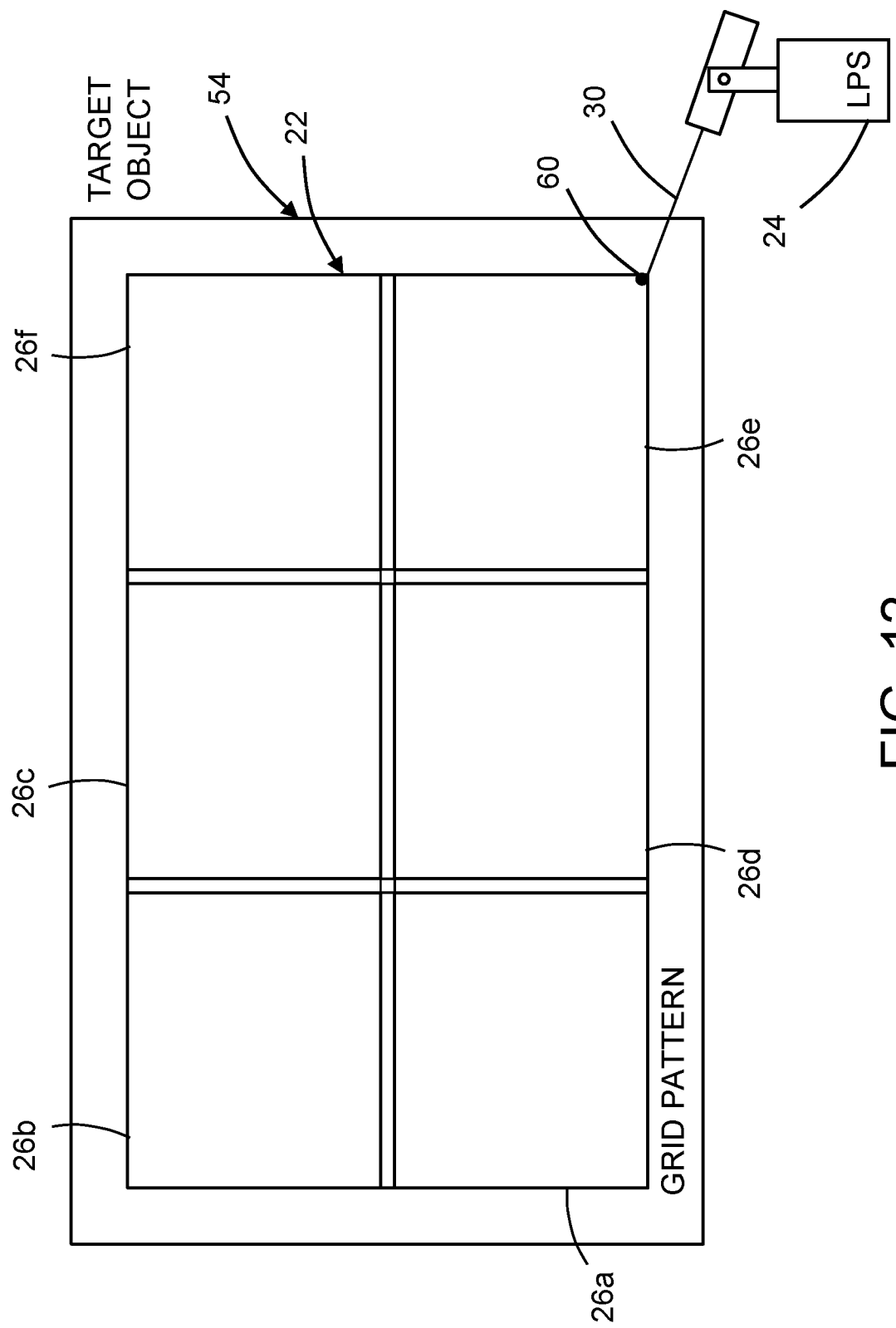
FIG. 12 is a diagram representing measurement of a scan region boundary using a local positioning system (LPS).

In order to correctly locate the scans in the coordinate system of an airplane, 3-D coordinate position measurements are taken of the boundary regions of the scans. This boundary reference allows the combined scan image to be placed in the same coordinate system as the target object and its associated CAD models. This enables association of acquired scans with the respective 3-D models of the target object, as well as providing location data for future reference. For this system, a local positioning system (LPS) 24 (shown in FIG. 12) is used to acquire 3-D coordinate position data in the coordinate system of the target object 54. For example, FIG. 12 shows the LPS 24 directing a laser beam 30 at a measured boundary position 60. Assuming that the LPS 24 has already be calibrated with respect to the coordinate system of the target object 54, the boundary position data points acquired by the LPS 24 can be used to determine the coordinates of each boundary position in the coordinate system of the target object 54.

In accordance with one embodiment, acquisition of the boundaries of a scan can be accomplished by targeting the corners of the IRT shroud 216 when the IRT scanner 214 (see FIGS. 5 and 8) is capturing the scan data for specific locations. These LPS boundary measurements are performed before the first scan and after the last scan, or at any intermediate location in the grid sequence. In accordance with one proposed implementation, the corners (or some known locations) on the IRT shroud 216 can have either active (e.g., LEDs) or passive optical targets or other visible features. The passive approach requires that the system operator run the LPS 24 to target the points; the use of active LED targets enables an automated approach using the LPS camera to detect the LEDs. Ideally it would be best to get all four corners of the scanned region, but the IRT shroud 216 sometimes occludes the optical targets, which makes them hard to target. The minimum number of optical targets needed for this part of the process is two, since one can make assumptions about the shape of the X by Y scanned region, for example, using surface normals from a 3-D CAD model of the target object.

Figure 13:
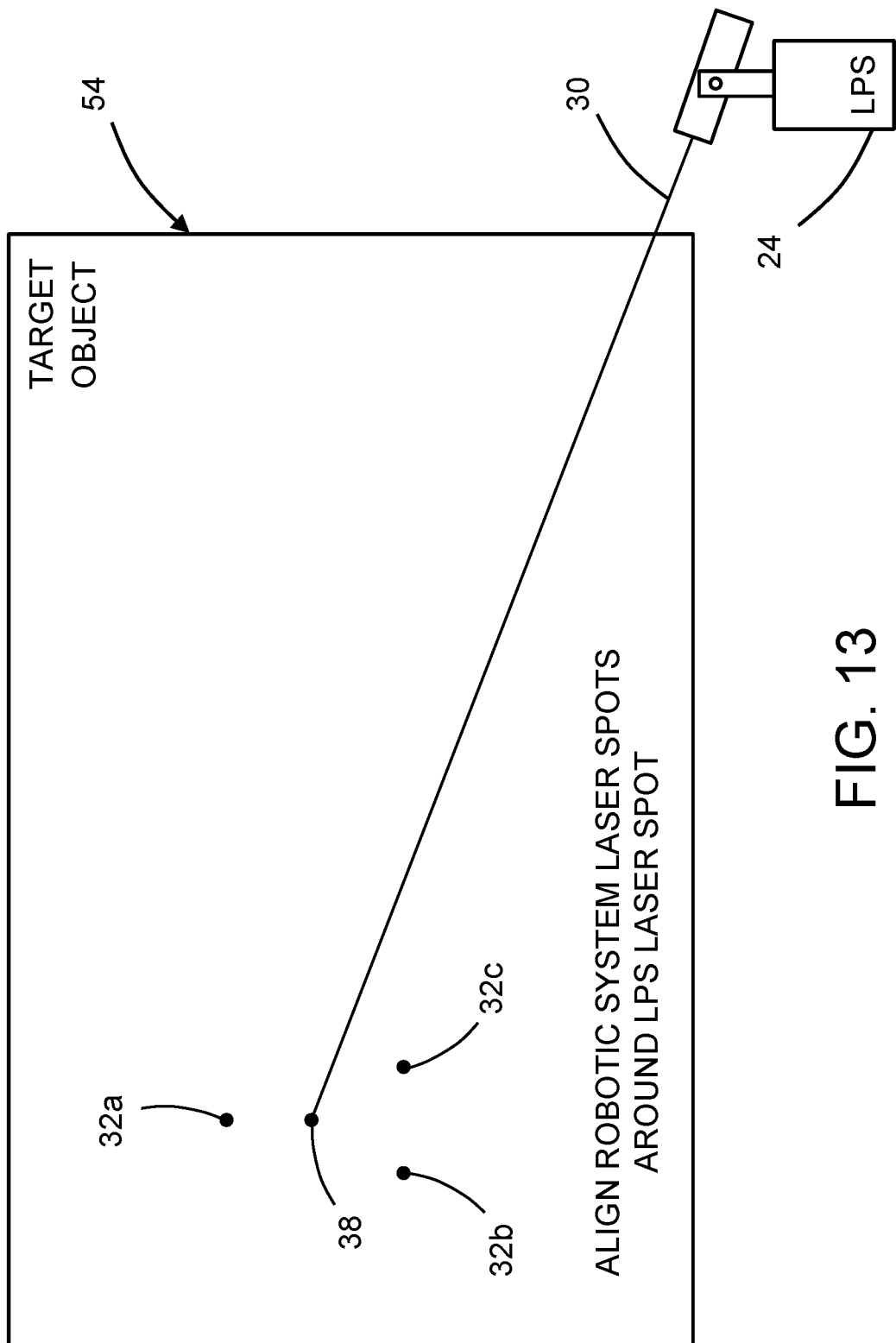
FIG. 13 is a diagram representing initial location alignment of the robotic system using the LPS.

The motorized pan-tilt control aspects of the LPS 24 allow it to also provide an initial location reference and guidance capability to indicate a desired first location for scans. After an initial calibration of the LPS 24 to known locations on the target object, the operator can instruct the LPS 24 to aim its laser pointer at a specified 3-D coordinate on the target surface, which laser spot 38 is indicated in FIG. 13. The operator then drives the robot to align the laser spots 32*a*, 32*b* and 32*c* of its laser range meters 236, 238 and 240 respectively around the LPS laser spot 38, as shown in FIG. 13.

In order to use the LPS 24 to acquire measurements in the coordinate system of the target object 54 (e.g., an airplane), the system operator needs three known points on the target object. These three points are calibration points, which are separate from the points on the IRT shroud 216 that are measured for the scan registration process. This means that if one wants to align the scan data with the airplane coordinates, the total minimum number of LPS measurements is five: three for the initial LPS calibration and two to define the rectangular region in which the scan took place.

Figure 14:
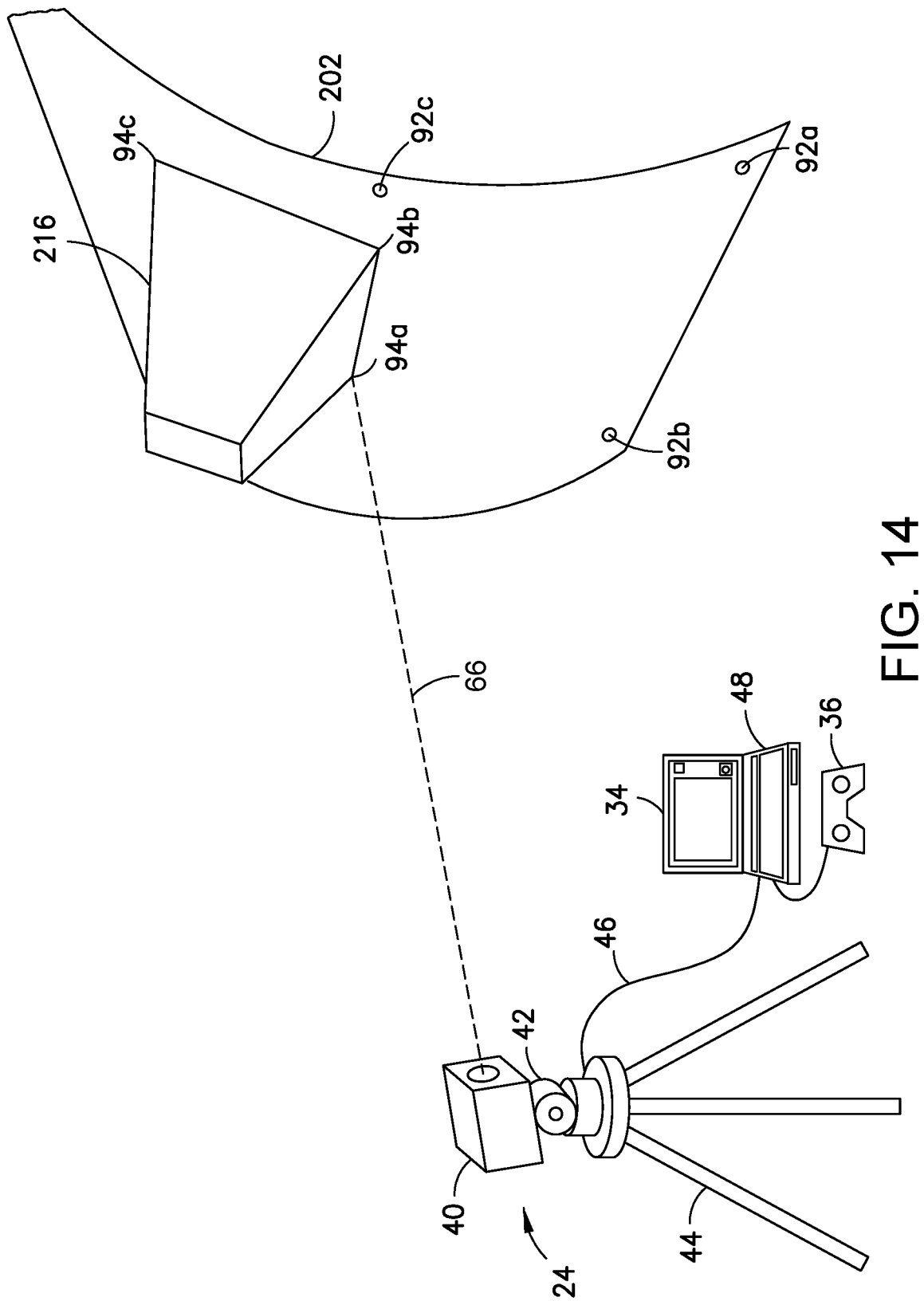
FIG. 14 is diagram representing a perspective view of the LPS executing a robot-to-part localization process in accordance with one embodiment.

FIG. 14 is a perspective view of a system capable of executing a robot-to-target localization process in accordance with one embodiment. The robot-to-target localization process is performed using an LPS 24 comprising a single camera 40 and a laser range meter (not shown) on a controllable pan-tilt unit 42. The LPS operation and calibration process is disclosed in U.S. Pat. No. 7,859,655, the disclosure of which is incorporated by reference herein in its entirety.

More specifically, the local positioning system depicted in FIG. 14 comprises a video camera 40 which may have automated (remotely controlled) zoom capabilities. The video camera 40 is supported on a pan-tilt mechanism 42. The video camera 40 and the pan-tilt mechanism 42 may be operated by an LPS control computer 48. The LPS control computer 48 communicates with the video camera 40 and the pan-tilt mechanism 42 through a video/control cable 46. Alternatively, the LPS control computer 48 may communicate with video camera 40 and pan-tilt mechanism 42 through a wireless communication pathway (not shown). The LPS control computer 48 is configured to control the operation of the LPS hardware, including the laser range meter (not shown), the video camera 40 and the pan-tilt mechanism 42. For example, the pan and tilt angles of the pan-tilt mechanism 42 and, therefore, the orientation of the video camera 40 can be controlled using the keyboard of computer 48 or other user interface hardware 36 (e.g., a gamepad). The optical image field, as sighted by the video camera 40, can be displayed on the monitor 34 of computer 48.

The pan-tilt mechanism 42 is controlled to rotationally adjust the laser range meter (not shown) and the video camera 40 to selected angles around a vertical, azimuth (pan) axis and a horizontal, elevation (tilt) axis. A direction vector 66 (indicated by a dashed line in FIG. 14), that describes the orientation of the laser range meter (not shown) and video camera 40 relative to the fixed coordinate system of the tripod 44 (or other platform on which the pan-tilt unit is attached), is determined from the pan and tilt angles when the camera is aimed at a point of interest. In FIG. 14, the direction vector 66 extends from the laser range meter (not shown) and video camera 40 and intersects a point 94a on one corner of the shroud 216.

A laser range meter may be incorporated inside the housing of camera 40 or mounted to the outside of camera 40 in such a way that it transmits a laser beam along the direction vector 66. The laser range meter is configured to measure the distance to any visible feature (e.g., one of the corners 94a-c) on the shroud 216 or the distance to any calibration point (e.g., points 92a-c) on the curved workpiece 202. (Each calibration point may be a visible feature on the curved workpiece 202 or an optical target attached to the curved workpiece 202.) The laser range meter may have a laser and a unit configured to compute distances based on the laser light detected in response to a laser beam reflected from the point of impingement.

The local positioning system shown in FIG. 14 further comprises three-dimensional localization software which is loaded into LPS control computer 48. For example, the three-dimensional localization software may be of a type that uses multiple calibration points 92a-c on the curved workpiece 202 to define the location (position and orientation) of video camera 40 relative to curved workpiece 202. The calibration points 92a-c may be visible features of known position in the local coordinate system of the curved workpiece 202 as determined from a three-dimensional database of feature positions (e.g., a CAD model) or other measurement technique. During the LPS calibration process, X, Y, Z data for at least three non-collinear points are extracted from the CAD model. Typically calibration points are selected which correspond to features that can be easily located on the target object. The three-dimensional localization software utilizes the X, Y, Z data of the calibration points 92a-c and the pan and tilt data from the pan-tilt mechanism 42 to define the relative position and orientation of the video camera 40 with respect to the local coordinate system of the curved workpiece 202. The measured distances to the calibration points 92a-c may be used in coordination with the pan and tilt angles from the pan-tilt mechanism 42 to solve for the camera position and orientation relative to the curved workpiece 202. A method for generating an instrument-to-target calibration transformation matrix (sometimes referred to as the camera pose) is disclosed in U.S. Pat. No. 7,859,655. Using the known and measured data, the calibration process computes the 4×4 homogeneous transformation matrix that defines the position and orientation of the video camera 40 relative to the curved workpiece 202.

Once the position and orientation of the video camera 40 with respect to the curved workpiece 202 have been determined and a camera pose transformation matrix has been generated, camera pan data (angle of rotation of the video camera 40 about the azimuth axis) and tilt data (angle of rotation of the video camera 40 about the elevation axis) may be used in conjunction with the calculated position and orientation of the video camera 40 to determine the X, Y and Z coordinates of any point of interest on the shroud 216 in the coordinate system of the curved workpiece 202. By locating the shroud 216 at the beginning and at the end of the scan pattern, the location of the scan pattern in the coordinate system of the curved workpiece 202 can be determined.

More specifically, a relative localization process can be used to determine the location of a visible feature of the shroud 216 (e.g., any one of the corners 94a-c depicted in FIG. 14) in the coordinate system of the curved workpiece 202 at the beginning and end of the scan pattern. The basic process sequence as applied to the shroud 216 is as follows: (1) The local positioning system calibrates to the coordinate system of the target object being inspected (e.g., curved workpiece 202) by measuring three known points 92a-c on the target object. (2) The local positioning system measures the location of a visible feature (e.g., corner 94a) on the shroud 216 when the robot is at the beginning of the scan pattern (e.g., for scan area 26a seen in FIG. 12). (3) Later the local positioning system is used to measure the location of the same visible feature or a different visible feature (e.g., corner 94b or 94c) on the shroud 216 when the robot is at the end of the scan pattern (e.g., for scan area 26f seen in FIG. 12). (4) This allows the operator to determine the boundaries of the scans making up the mosaic pattern.

The LPS control software running in computer 48 computes the location of each visible feature on the shroud 216 relative to the coordinate system of the curved workpiece 202. The LPS control computer 48 (see FIG. 14) sends the location data to the expert workstation 74 depicted in FIG. 17, which is configured to record the location coordinates for future reference. This location data may also be used to align the scan data with a CAD model of the target object.

The LPS control software on computer 48 outputs the point data as X, Y and Z values, but control applications need more than just X, Y and Z data points to provide the position and orientation of the part 90. To solve the position and orientation problem, the X, Y and Z data from the three measured points 92a-c and the known dimensions of these points are used to compute the full 6-degrees-of-freedom position and orientation representation. This is what the previously described localization software does. The position and orientation format that the localization software uses is a 4×4 transformation matrix, but there are other ways to represent the data.

If the system operator wishes to perform a relative LPS scan (as described in U.S. Patent Application Publ. No. 2015/0268033), then the operator can use any three non-collinear points on the target object, but does not need to know the 3-D coordinates for those points beforehand (as one does with the standard LPS method). The system operator will not obtain the results in target object coordinates with the relative mode, but for some applications that is not needed. The relative LPS localization process can be used to ensure that the NDI sensor is aligned in the same region as was the situation earlier. It is also useful for piecing together several separate scans or if it was necessary to move the LPS.

As previously disclosed, the system uses distance measurement devices, such as lasers, string encoders, ultrasonic sensors, with the basic requirement being at least three non-collinear distance measurement devices. One distance sensor configuration (described above) uses three distance measurement lasers arranged in triangular formation. In an alternative embodiment, four distance measurement lasers are arranged in rectangular formation. Regardless of which sensor configuration is used, the distance data is fed to the robot controller 80, along with end effector orientation data. Feedback control methods can be used to drive to zero the error between the current angle and the desired angle.

Figure 15B:
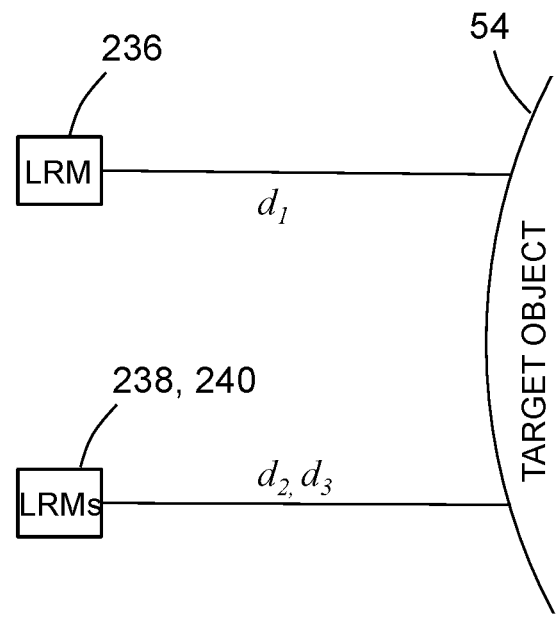
Figure 15C:
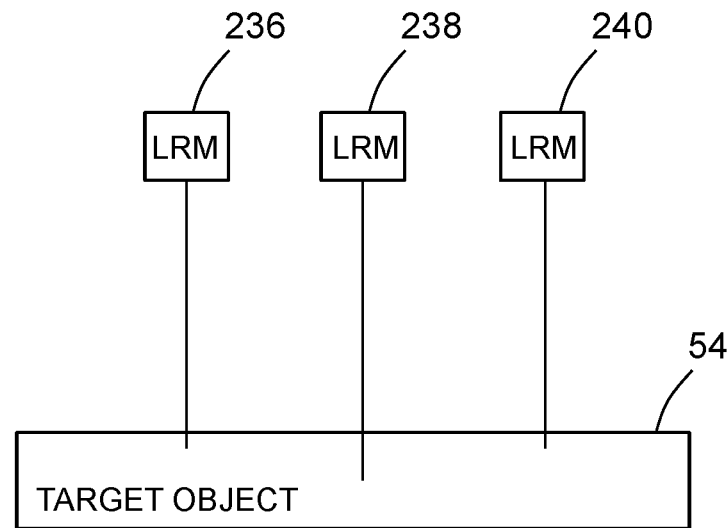

A method for determining angles using laser range meters will now be described with reference to FIGS. 15A-15C. FIGS. 15A through 15C are diagrams representing front, side and top views respectively of three laser range meters 236, 238 and 240 arranged in a triangular pattern in a common plane and directed at respective spots on a surface of a target object 54, the laser range meters and spots being separated by respective distances.

In addition to using the three lasers to determine distance to the target, they are also used to determine the yaw and pitch angles. FIG. 15A shows positions of the laser range meters 236, 238 and 240 relative to each other using a horizontal dimension a and a vertical dimension b, along with measured distances $d_1$, $d_2$, and $d_3$ to the surface of the target object 54 Equations (1) and (2) can be used to calculate the pitch and yaw angles:

$$\text{PitchAngle} = a \tan 2(d_1 - (d_2 + d_3)/2, b) \quad (1)$$

$$\text{YawAngle} = a \tan 2(d_2 - d_3, a) \quad (2)$$

where PitchAngle and YawAngle are the current computed angles for the alignment apparatus shown in FIGS. 15A-15C relative to the surface of the target object 54. The goal for these angles, which are measured relative to the surface normal at the current location, is to be equal to zero; and the process to achieve the goal angles is described below.

With the current yaw and pitch angles calculated, the system motion controller can use a velocity control method for the controlled motions: pan, tilt, and distance. A feedback controller, such as a proportional-integral-derivative (PID) controller, can be used to drive to zero the error between the current angle and the desired angle. Equations (3) and (4) can be used to compute the pitch and yaw motion control:

$$\text{PitchRate} = Kp_{pitch} * (\text{PitchAngle} - \text{PitchAngle}_{goal}) \quad (3)$$

$$\text{YawRate} = Kp_{yaw} * (\text{YawAngle} - \text{YawAngle}_{goal}) \quad (4)$$

where PitchRate and YawRate describe the angular rotation rates about the pitch axis of the alignment apparatus and yaw axis of the base, respectively; $Kp_{pitch}$ and $Kp_{yaw}$ are the proportional feedback gains associated with the pitch and yaw axes, respectively; PitchAngle and YawAngle are the angles computed from Eqs. (1) and (2), respectively; and $\text{PitchAngle}_{goal}$ and $\text{YawAngle}_{goal}$ are the desired goal angles to which the controller is driving the system toward (as mentioned earlier, these are both zero for this example). Integral and derivative feedback may also be used, but are not shown here.

The base velocity equations are as follows:

$$\text{Vel}_x = Kp_x * (\text{MinDist}_x - \text{offset}_x) \quad (5)$$

$$\text{Vel}_y = Kp_y * (\text{MinDist}_y - \text{offset}_y) \quad (6)$$

where $\text{Vel}_x$ and $\text{Vel}_y$ are the lateral velocities of the base; $Kp_x$ and $Kp_y$ are the proportional feedback gains for the X and Y directions of the base, respectively; $\text{MinDist}_x$ and $\text{MinDist}_y$ are the smallest values measured by the lasers in the X and Y directions, respectively; and $\text{offset}_x$ and $\text{offset}_y$ are the goal offset distances. For some applications, the lasers are not configured to measure in both X and Y directions; in those cases the X or Y velocity control equations associated with the alignment process would not be used.

Figure 16:
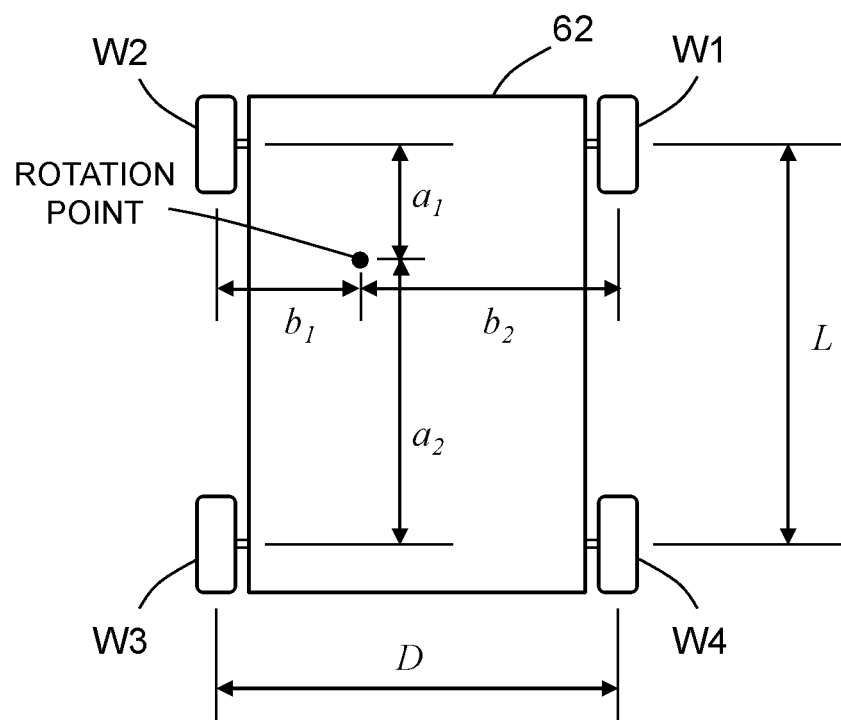
FIG. 16 is a diagram representing a top view of a holonomic-motion base platform having four Mecanum wheels with various dimensions indicated by double-headed arrows.

For a holonomic-motion base platform that comprises a base frame 62, one pair of Type A Mecanum wheels W1 and W3 along one diagonal and one pair of Type B Mecanum wheels W2 and W4 along the other diagonal, kinematics can be used to compute the four individual wheel velocities. The dimensions of the vehicle (L and D) and desired rotation point (described by the distances $a_1$, $a_2$, $b_1$, $b_2$) are shown in FIG. 16. The individual wheel velocities for wheels W1 through W4 are shown in Eqs. (7) through (10):

$$V_{W1} = \text{Vel}_y - \text{Vel}_x + \text{YawRate} * (a_1 + b_1) \quad (7)$$

$$V_{W2} = \text{Vel}_y + \text{Vel}_x - \text{YawRate} * (a_1 + b_2) \quad (8)$$

$$V_{W3} = \text{Vel}_y - \text{Vel}_x - \text{YawRate} * (a_2 + b_2) \quad (9)$$

$$V_{W4} = \text{Vel}_y + \text{Vel}_x + \text{YawRate} * (a_2 + b_1) \quad (10)$$

where $V_{Wi}$ (for i=1, 2, 3, 4) are individual wheel velocities; $\text{Vel}_x$ and $\text{Vel}_y$ are the lateral velocities from Eqs. (5) and (6); YawRate is the yaw rotation rate from Eq. (4); and $a_1$, $a_2$, $b_1$, $b_2$ are the rotation point distances as shown in FIG. 16.

The primary pivot configurations for the end effector are the following: (a) one-axis pivot: one motor, one angle sensor; and (b) two-axis gimbal: two motors, two angle sensors.

The above-described alignment process addresses both discrete and continuous sensor update use cases, and the concept can also be packed as a stand-alone system or part of an existing system.

Although the concepts disclosed herein have application for holonomic-motion base platforms, variations are also applicable to other systems. Potential use cases include: holonomic and non-holonomic platforms; articulated robotic arms; gantry arms; hybrid motion-base/arm systems; helicopters and UAVs; cameras; lights; and tools.

The laser-based alignment process disclosed herein enables the system to be operated without having to teach the robot on-line or preprogram it off-line, which makes this approach easier to use. This guides the end effector into place while adapting to unexpected changes in the environment. Instead of playing through a list or pre-programmed motion steps, the system operates as a finite-state machine using feedback from sensors to transition between the various steps in the alignment, grid-based motion, and scanning process.

The alignment sensors also provide collision avoidance ability for the end effector. The configuration of the system allows it to reach areas on the fuselage all the way up to the crown (top) from a ground-based holonomic platform. The solution provides an optional process for collecting location reference data using an external measurement system (LPS).

The ability to collect location data defined in the coordinate system of the target object (e.g., an airplane) allows accurate registration of the scan data with CAD data for maintenance/repair use, as well as a way to record location information for archival purposes.

The configuration of the system using a vertical extension arm with a rotating wrist and modular tool mount, in addition to the alignment sensor elements, provides a compact and relatively low-cost platform that can reach required areas around the fuselage with a minimal ground footprint.

The system disclosed herein can be configured to accept various types of NDI devices mounted to its end effector, including: eddy current, ultrasonic, and infrared thermography (IRT) sensors. A vertical support mast with a pivoting end effector on an extension arm allows full height inspection of an airplane fuselage section. The holonomic-motion base allows efficient re-positioning of the sensor unit along the length of the fuselage. Motion control software enables automatic capture overlapping grid pattern scans. Reference position data is captured for scan alignment with airplane coordinates.

During operation, this system can be driven (teleoperated) by an operator to get it into the general location of the starting region, and is then configured to automatically acquire grid scans arranged in an operator-defined vertical and horizontal pattern along either side of the airplane fuselage. One of the features of the motion control algorithm used here is that it involves distance sensor feedback instead of requiring individual pre-defined motion paths for the system, which simplifies usage and reduces setup time. In order to correctly locate the scans in the coordinate system of the airplane, 3-D coordinate position measurements are taken of the boundary regions of the scans. A local positioning system is used to acquire 3-D coordinate position data in the coordinate system of the airplane. This reference position data is then used to align the NDI scans with the appropriate airplane coordinate system.

Figure 17:
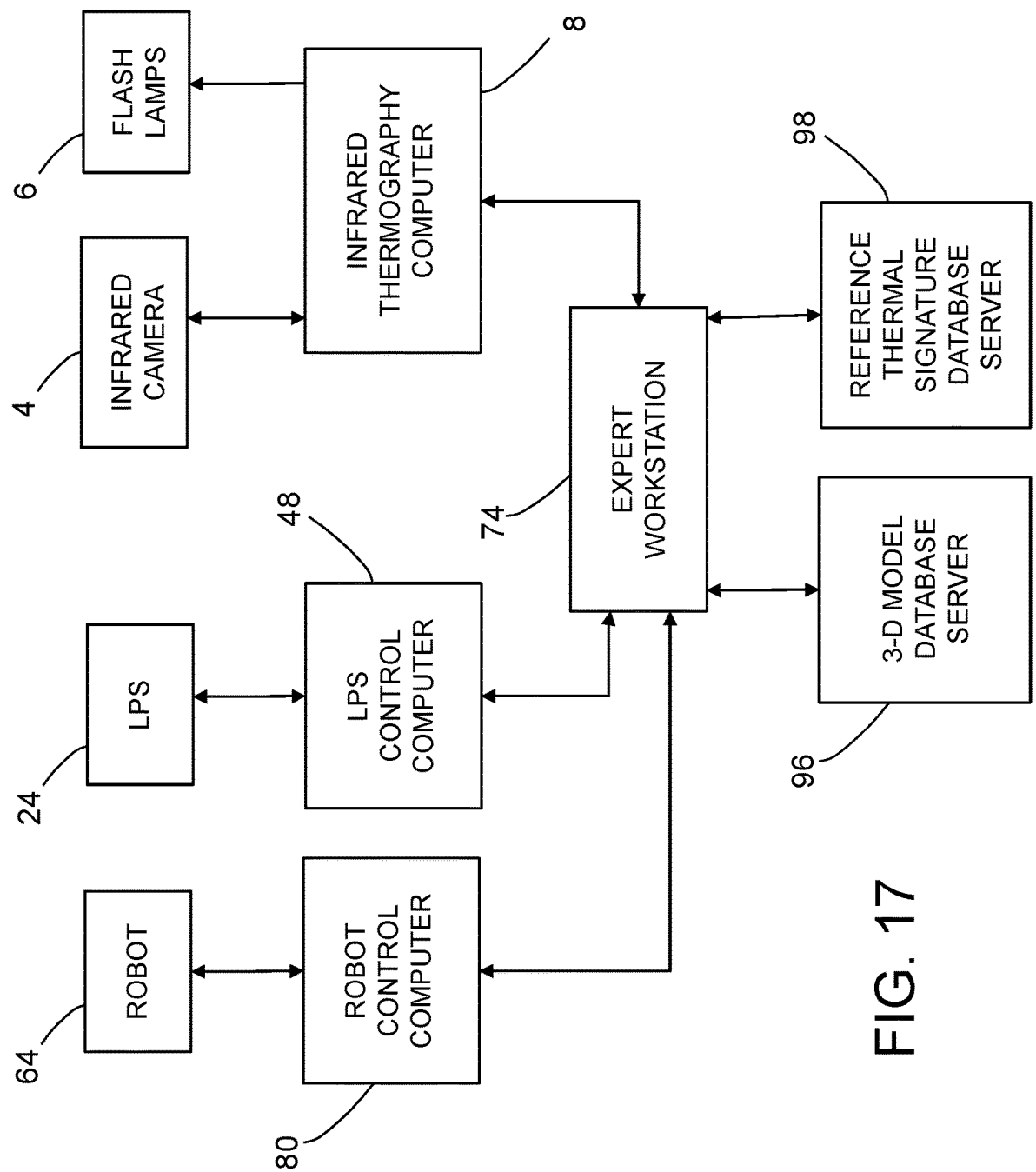
FIG. 17 is a block diagram identifying some components of a system for infrared thermographic inspection of large composite structures in accordance with some embodiments.

FIG. 17 is a block diagram identifying some components of a system for infrared thermographic inspection of large-scale composite structures in accordance with one computer architecture. Movements of a robot 64 are controlled by a robot controller 80 based on a finite-state machine and feedback from at least distance sensors (e.g., three laser range meters). Movements and firing of the LPS 24 are controlled by an LPS control computer 48, which also receives laser tracking data from the LPS 24. Activation of the infrared camera 4 and flash lamps 6 are controlled by an infrared thermography computer 8, which also receives infrared imaging data from the infrared camera 4. All of these computers can be in wireline or wireless communication with a master computer at an expert workstation 74. The master computer at the expert workstation 74 may be programmed to correlate the laser tracking data with the infrared imaging data. The master computer may be further programmed to request 3-D model data from a 3-D model database server 96. In the case of thermographic porosity measurement, the master computer at the expert workstation 74 may also be programmed to request reference thermal signature data from a reference thermal signature database server 98.

The LPS control computer 48 acquires location data for the infrared camera 4 in a 3-D coordinate system of the composite structure. In the case of a barrel-shaped fuselage section, the infrared imaging data can be mapped directly onto a 3-D model of the fuselage section. The overlay of infrared imaging data with the 3-D model data enables improved data analysis and potential automated data analysis as well. For example, features/flaw indications can be directly correlated to the fuselage structure by direct overlay of infrared imaging data on the 3-D model. In addition, the direct data overlay onto the model can be used to determine the thickness of a local area or spatial point, which is needed for porosity quantification. In one embodiment, the process involves application of infrared imaging data strips as one or more computer graphics texture maps, which are projected onto the 3-D model surfaces in a virtual environment displayed on a monitor or computer screen at the expert workstation 74.

While methods for controlling the location of a robotic end effector relative to a target object have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "location" comprises position in a three-dimensional coordinate system and orientation relative to that coordinate system. As used in the claims, the term "moving the end effector" should be construed broadly to include at least one or more of the following: moving a base platform relative to ground, moving a robotic arm relative to the base platform, and moving the end effector relative to the robotic arm.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for controlling a location of an end effector of a robotic mobile platform relative to a target object, comprising:

moving an end effector having a scanner and first, second and third distance sensors mounted thereto to a first location where the first, second and third distance sensors are separated from respective areas on a surface of a target object by first, second and third distances respectively;

measuring the first, second and third distances using the first, second and third distance sensors respectively; and enabling a robot controller to execute operations specified by a finite-state machine control application, which operations comprise:

acquiring distance data from the first, second and third distance sensors mounted to the end effector while the end effector is at the first location, wherein the acquired distance data represents respective measurements of the first, second and third distances by the first, second and third distance sensors respectively;

computing orientation and translation offsets from a first grid location at which the scanner will be separated from the surface of the target object by a goal offset distance and an aim axis of the scanner will be perpendicular to the surface of the target object using the acquired distance data; and moving the end effector from the first location to the first grid location by performing steps comprising:

aligning the distance of the scanner from the surface of the target object to the goal distance offset;

aligning a yaw angle of the end effector to achieve perpendicularity of the aim axis of the scanner to the surface of the target object;

adjusting a lateral position of the end effector;

aligning a pitch angle of the end effector to achieve perpendicularity of the aim axis of the scanner to the surface of the target object; and adjusting a height of the end effector.

2. The method as recited in claim 1, wherein aligning the yaw angle and pitch angle comprises rotating the end effector so that the aim axis of the scanner is perpendicular to the surface of the target object.

3. The method as recited in claim 2, wherein the rotating the end effector comprises rotating the end effector about a pitch axis.

4. The method as recited in claim 3, further comprising rotating a base of the robotic mobile platform about a yaw axis.

5. The method as recited in claim 2, wherein aligning the distance comprises displacing the end effector so that the scanner is separated from the surface of the target object by the goal offset distance.

6. The method as recited in claim 1, wherein aligning the distance comprises displacing the end effector so that the scanner is separated from the surface of the target object by the goal offset distance.

7. The method as recited in claim 1, further comprising calculating coordinates of a location of an external tracking system in a coordinate system of the target object.

8. The method as recited in claim 7, further comprising aiming a laser beam produced by the external tracking system at a specified coordinate position on the surface of the target, thereby forming a laser spot, wherein moving the end effector to the first location comprises driving the robotic mobile platform to align laser spots produced by the first, second and third distance meters around the laser spot produced by the external tracking system.

9. The method as recited in claim 7, further comprising calculating coordinates of a visible feature on a tool mounted to the end effector in the coordinate system of the target object using the external tracking system while the end effector is at the first grid location.

10. The method as recited in claim 1, wherein the operations specified by the finite-state machine control application further comprise:

activating the scanner while the end effector is at the first grid location;

moving the end effector from the first grid location to a second grid location using the finite-state machine control application; and activating the scanner while the end effector is at the second grid location.

11. The method as recited in claim 10, wherein the scanner is an infrared thermography scanner and the operations specified by the finite-state machine control application further comprise:

acquiring a first infrared thermography scan while the end effector is at the first grid location; and acquiring a second infrared thermography scan while the end effector is at the second grid location.

12. The method as recited in claim 11, further comprising stitching together the first and second infrared thermography scans.

13. A robotic mobile platform comprising:

a self-propellable mobile base platform comprising a plurality of rolling elements and a plurality of motors respectively coupled to said plurality of rolling elements;

a vertically extendible mast carried by the base platform;

an arm having a proximal end fixedly coupled to the vertically extendible mast;

an end effector pivotably coupled to a distal end of the arm;

a scanner mounted to the end effector;

a non-transitory tangible computer-readable storage medium in which a finite-state machine control application is stored;

first, second and third distance sensors mounted to the end effector and configured to measure first, second and third distances respectively separating the first, second and third distance sensors from respective areas on a surface of a target object and output distance data representing measurements of the first, second and third distances; and a controller configured to control operation of the first, second and third distance sensors and move the end effector relative to ground in accordance with commands generated by the finite-state machine control application, wherein the finite-state machine control application comprises operations to generate instructions executable by the controller for moving the end effector using the distance data output by the first, second and third distance sensors, wherein the operations which the finite-state machine control application is configured to perform comprise:

computing orientation and translation offsets from a grid location at which the scanner will be separated from the surface of the target object by a goal offset distance and an aim axis of the scanner will be perpendicular to the surface of the target object using the distance data; and moving the end effector from the first location to the grid location so that the distance of the scanner from the surface of the target object is aligned to the goal distance offset, and a yaw angle and a pitch angle of the end effector are aligned to achieve perpendicularity of the aim axis of the scanner to the surface of the target object using the orientation and translation offsets.

14. The robotic mobile platform as recited in claim 13, wherein the first, second and third distance sensors are laser range meters.

15. The robotic mobile platform as recited in claim 13, wherein the scanner is an infrared thermography scanner.

16. The robotic mobile platform as recited in claim 15, wherein the infrared thermography scanner comprises a shroud.

17. A method for controlling the location of an end effector of a robotic mobile platform relative to a target object, comprising:

enabling a robot controller to execute operations specified by a finite-state machine control application, which operations comprise:

(a) moving an the end effector having first, second and third distance sensors mounted thereto to a nominal location not in contact with a surface of the target object in accordance with pre-stored grid pattern data representing a grid pattern, wherein the first, second and third distance sensors are separated from respective areas of the surface of the target object by first, second and third distances respectively;

(b) measuring the first, second and third distances using the first, second and third distance sensors respectively; and (c) acquiring distance data from the first, second and third distance sensors mounted to the end effector while the end effector is at the nominal location, wherein the acquired distance data represents respective measurements of the first, second and third distances by the first, second and third distance sensors respectively;

(d) computing orientation and translation offsets from a grid location at which the scanner will be separated from the surface of the target object by a goal offset distance and an aim axis of the scanner will be perpendicular to the surface of the target object using the distance data;

(e) moving the end effector from the first location to the grid location so that the distance of the scanner from the surface of the target object is aligned to the goal distance offset, and a yaw angle and a pitch angle of the end effector are aligned to achieve perpendicularity of the aim axis of the scanner to the surface of the target object using the orientation and translation offsets;

(f) activating the scanner while the end effector is at the aligned location; and (g) repeating steps (a) through (f) for each one of a multiplicity of aligned locations of the grid pattern.

18. The method as recited in claim 17, wherein the scanner is an infrared thermography scanner and the operations specified by the finite-state machine control application further comprise acquiring a respective infrared thermography scan while the end effector is at each aligned location, further comprising stitching together the infrared thermography scans.

19. The method as recited in claim 1, wherein the first, second and third distance sensors are laser range meters.

20. The method as recited in claim 17, wherein the first, second and third distance sensors are laser range meters.

* * * * *